(12) United States Patent
Vora et al.

(10) Patent No.: US 8,131,528 B1
(45) Date of Patent: Mar. 6, 2012

(54) REPORTING DELAY USING VISUAL INDICATORS IN A MODEL

(75) Inventors: Chandresh Vora, Ashland, MA (US); Martin Clark, Boston, MA (US); Michael H. McLernon, Attleboro, MA (US)

(73) Assignee: The MathWorks, Inc., Natick, MA (US)

( * ) Notice: Subject to any disclaimer, the term of this patent is extended or adjusted under 35 U.S.C. 154(b) by 925 days.

(21) Appl. No.: 11/648,433

(22) Filed: Dec. 29, 2006

(51) Int. Cl.
*G06F 17/50* (2006.01)
(52) U.S. Cl. ........................................... 703/19
(58) Field of Classification Search ................ 703/19
See application file for complete search history.

(56) References Cited

U.S. PATENT DOCUMENTS

| | | | |
|---|---|---|---|
| 4,667,240 A | 5/1987 | Willis et al. | |
| 6,100,736 A | 8/2000 | Wu et al. | |
| 6,311,147 B1* | 10/2001 | Tuan et al. | 703/18 |
| 7,219,048 B1* | 5/2007 | Xu | 703/19 |
| 2004/0208193 A1 | 10/2004 | Orofino et al. | |

OTHER PUBLICATIONS

Simulink, Model-based and System-based Design, Version 4, The MathWork, Inc. 1990-2001, pages all.*
Lee, Verilog Quickstart 3rd eddition, 2002, pp. 55, 338.*

* cited by examiner

*Primary Examiner* — Paul Rodriguez
*Assistant Examiner* — Eunhee Kim
(74) *Attorney, Agent, or Firm* — Nelson Mullins Riley & Scarborough LLP

(57) ABSTRACT

Exemplary embodiments report delay incurred in a model. Exemplary embodiments identify an incurred delay that is related to a graphical affordance in the model and generate a visual indicator associated with the graphical affordance in the model. The visual indicator is related to the incurred delay. Exemplary embodiments render the visual indicator with an output device to depict the incurred delay that is related to the graphical affordance in the model.

57 Claims, 20 Drawing Sheets

| Block | Framing and Timing at Block Output |
|---|---|
| Bernoulli Binary Source | 10 \| 10 |
| Buffer Up | 15 \| 15 |
| Buffer Down | 10 \| 10 |

Fig. 9B

| Block | Framing and Timing at Block Output |
|---|---|
| Bernoulli Binary Source | 10 \| 10 |
| Buffer Up | 15 \| 15 |
| Buffer Down | 5 \| 10 \| 10 |

Fig. 9D

REPORTING DELAY USING VISUAL INDICATORS IN A MODEL

BACKGROUND

Various classes of graphical models describe computations that can be performed on application specific computational hardware, such as a computer, microcontroller, FPGA, and custom hardware. Classes of such graphical models can include, but are not limited to time-based block diagrams, such as those found within Simulink® software from The MathWorks, Inc. of Natick, Mass.; state-based and flow diagrams, such as those found within Stateflow® software from The MathWorks, Inc. of Natick, Mass.; and data-flow diagrams, such as those found in LabVIEW® from National Instruments Corporation of Austin, Tex. A common characteristic among these various forms of graphical models is that they define semantics on how to execute the diagram.

Historically, engineers and scientists have utilized time-based graphical models in numerous scientific areas such as feedback control theory and signal processing to study, design, debug, and refine models of a system, such as a dynamic system. Dynamic systems, which can be characterized by the fact that their behaviors change based on, for example, input stimuli, time, conditions or events, are representative of many real-world systems. Time-based graphical modeling has become particularly attractive over the last few years with the advent of software packages such as Simulink® software. Such packages provide sophisticated software platforms with a rich suite of support tools that makes the modeling, analysis and design of dynamic systems efficient, methodical, and cost-effective.

A dynamic system (either natural or man-made) is a system whose response at any given time is a function of its input stimuli, its current state, and the current time. Such systems may range from simple to highly complex systems. Physical dynamic systems may include such things as falling bodies, the rotation of the earth, bio-mechanical systems (muscles, joints, etc.), bio-chemical systems (gene expression, protein pathways), weather/climate pattern systems, etc. Examples of man-made or engineered dynamic systems can include: a bouncing ball, a spring with a mass supported on an end, automobiles, airplanes, control systems in appliances, communication networks, audio signal processing, power plant control systems, stock trading systems, etc.

Professionals from diverse areas such as engineering, science, education, and economics build mathematical models of dynamic systems in order to better understand system behavior as it changes with the progression of time. These models may also be used in education, such as for teaching basic principles governing physical systems. Graphical models may be used in the specification, development, analysis, verification and validation, testing, and calibration of dynamic systems.

For many systems, the knowledge of end-to-end delay can be important in designing models of systems in graphical modeling environments. Model designers may not be able to access and/or analyze delays associated with existing models.

SUMMARY

In one aspect, a method in a computing system that provides an environment for modeling a system is disclosed. The method includes depicting a graphical affordance in the model via an output device. The method further includes depicting a visual indicator on or about to the graphical affordance, wherein the visual indicator corresponds to an incurred delay related to the graphical affordance in the model.

In another aspect, a medium that holds instructions that are executable in a computing system are disclosed. The instructions enable depicting a graphical affordance in the model via an output device. The instructions further enable depicting a visual indicator on or about the graphical affordance, wherein the visual indicator corresponds to an incurred delay related to the graphical affordance.

In yet another aspect, a computing system for reporting an amount of delay incurred in a model in a modeling environment is disclosed. The system includes a modeling environment and an output device. The modeling environment indicates an incurred delay related to a graphical affordance of the model using a visual indicator. The output device depicts the graphical affordance. The depiction incorporates the visual indicator.

In still another aspect, a method in a computing system for reporting delay incurred in a model is disclosed. The method includes identifying an incurred delay that is related to a graphical affordance in the model. The method also includes generating a visual indicator associated with the graphical affordance in the model, the visual indicator related to the incurred delay. The method further includes rendering the visual indicator with an output device to depict the incurred delay that is related to the graphical affordance in the model.

In a further aspect, a medium that holds instructions executable in a computing system is disclosed. The instructions enable identifying an incurred delay that is related to a graphical affordance in the model. The instructions also enable generating a visual indicator associated with the graphical affordance in the model. The visual indicator is related to the incurred delay. The instructions further enable rendering the visual indicator with an output device to depict the incurred delay that is related to the graphical affordance in the model.

Exemplary embodiments provide users with information on the delay incurred in a model before executing the model in a modeling environment. By reporting delay information of the model before executing the model, users may compensate for the delay without executing the model in the modeling environment.

BRIEF DESCRIPTION OF THE DRAWINGS

The accompanying drawings, which are incorporated in and constitute a part of this specification, illustrate one or more exemplary embodiments and, together with the description, explain the invention. In the drawings.

FIG. 9B depicts an exemplary frame timing diagram of a model without compensation;

FIG. 9D depicts an exemplary frame timing diagram of the model with delay compensation.

DETAILED DESCRIPTION

Figure 1A:
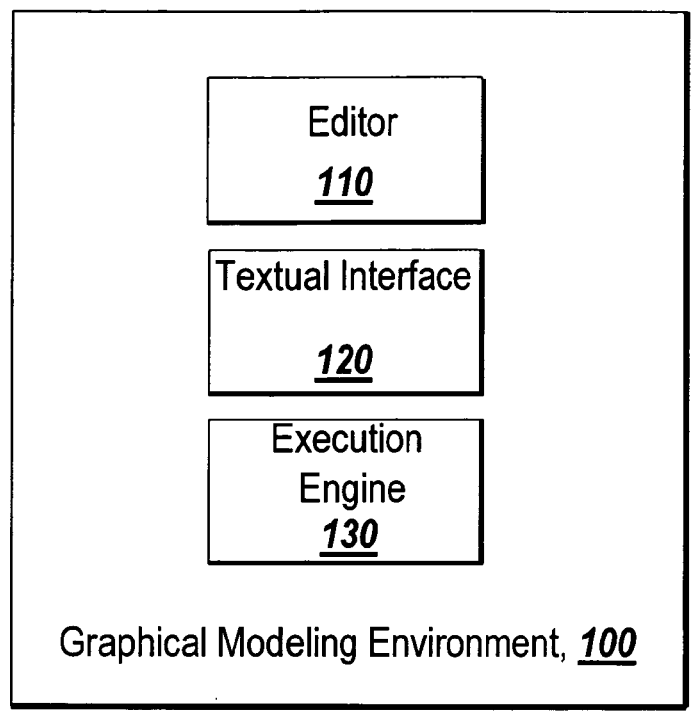
FIG. 1A shows an exemplary graphical modeling environment in accordance with exemplary embodiments.

Exemplary embodiments pertain to reporting delay incurred in at least a portion of a model. Illustrative embodiments will be described relative to a model implemented in a graphical modeling environment. Although embodiments will be described relative to a model implemented in a graphical modeling environment, such as differential and difference equation based modeling environments, block diagram modeling environments, state-based modeling environments or data flow modeling environments. Embodiments may apply to models implemented in other modeling environments including, but not limited to, textual modeling environments, such as command line modeling environments like the MATLAB® environment from the MathWorks, Inc.

As used herein, "graphical affordance" refers to an element, signal line, or any other graphical object that may be affected by delay in a model.

Exemplary embodiments may refer to delay as algorithmic delay. Algorithmic delay is delay that is intrinsic to the algorithm of elements in a graphical modeling environment. The algorithmic delay is independent of hardware speed. The algorithmic delay of a particular element may depend on both the element's parameter settings and the general settings of the graphical modeling environment. The delay can be expressed in terms of a number of samples by which the element's outputs lag behind corresponding inputs of the element. The delay may also be represented in terms of other quantities, such as a number of frames, an amount of time outputs of an element lag corresponding inputs of the element, computational cycles, queue wait times, server service times, and/or integration time steps.

A frame is referred to herein as a temporal collection of data samples. For example, a frame can include a fixed number of data samples that are transmitted as unit from one element to another element in a model. The samples in a frame may, for example, represent a serial stream of data that is transmitted during a specified time period. For example, a user or system can determine a time interval for a stream of data that is assembled into one or more frames. When an assembled frame is transmitted, all samples in the frame may be sent at substantially the same time.

As used herein, "sample rate" refers to a rate or frequency at which samples are available over time. For example, a sample rate of two per second refers to one sample being available each half second. A normalized and more concise reference is simply a sample rate of one half second. Alternatively, the reciprocal to sample rate, the sample time, is often used. As such, a sample rate of two per second equates a sample time of one half second.

As used herein, "frame rate" relates to a period of time that is occupied by one frame. For example, a frame with a frame rate of one per two seconds indicates that one frame occupies two seconds in time. This may be referred to as a frame rate of two seconds. To further illustrate, a frame may contain three samples, where each sample corresponds to a sample rate of 1 sample per second. The frame rate for this frame is one per three seconds, or, in concise normalized form, the frame rate is three seconds. Alternatively, the reciprocal to frame rate, the frame time, is often used. As such, a frame rate of two per second equates a frame time of one half second.

The algorithmic delay is meant to be an illustrative delay and is not limiting. For example, exemplary implementations may be extended and/or applied to reporting other types of delay, such as execution delays, computational delays, etc., that relate to a number of operations involved in the execution of elements in a model. The execution or computational delay may depend on the performance of both the hardware and underlying software layers.

FIG. 1A shows an exemplary graphical modeling environment 100 for implementing exemplary embodiments. The graphical modeling environment 100 includes an editor 110, a textual interface 120 and an execution engine 130.

The editor 110 is a graphical user interface (GUI) that allows users to draw, edit, annotate, save, and print models that represent systems. The editor 110 may allow users to specify the parameters for an element when the element is added to a model. The editor 110 may provide a set of windows that act as canvases for a model. In some instances, more than one window may be provided for a model because a model may be partitioned into multiple hierarchical levels using subsystems.

The textual interface 120 may be provided to allow interaction with the editor 110. The textual interface 120 may allow a user to enter commands to control the operation of the graphical modeling environment 100. For example, users may write special scripts that perform automatic editing operations on a model using this textual interface 120.

The execution engine 130 contributes to the modeling software task of enabling the computation and tracing of outputs of a model. The execution engine 130 carries out the task of compiling and linking the model to produce an "in-memory executable" version of the model that is used for generating code and/or simulating, trimming, or linearizing a model. The execution of the model may also be referred to as a simulation.

Figure 1B:
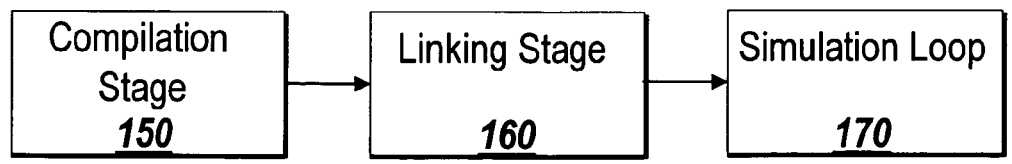
FIG. 1B depicts a flow diagram of exemplary steps for executing a model with the exemplary graphical modeling environment of FIG. 1A.

FIG. 1B is a flow diagram that illustrates exemplary steps for executing a model with the execution engine 130. The execution engine 130 implements a compilation stage 150 that prepares data structures, evaluates parameters, configures and propagates element and/or port/signal characteristics, determines element connectivity, performs element reduction and element insertion, etc. The preparation of data structures and the evaluation of parameters may create and initialize basic data-structures needed to compile and execute the model. The compiling stage 150 may implement execution methods that force an evaluation of parameters for elements in the model. An "execution method", as used herein, refers to computations that are executed when the execution method is invoked. An execution method may perform an operation on input parameters to provide output parameters that may be used in a model.

By forcing an evaluation of parameters, the compilation stage 150 may configure and/or propagate attributes of elements and/or ports/signals to create compiled attributes (such as dimensions, data types, complexity, sample time, etc.) for elements and/or ports/signals in a model. Propagation may cause specified attributes to "ripple through" the model from one element to the next possibly element or elements based on the signal connectivity of the model. Propagation ensures that explicitly specified attributes of an element are compatible with the attributes of other elements connected to the element. If the attributes are not compatible, an error may be issued. Further configuration and propagation may allow elements to adapt their behavior in accordance with the attributes of the elements connected to them. The exact implementation of an element can be chosen based on the specific model that incorporates the element. During the compilation stage 150, other aspects may be implemented, such as validating that all rate transitions within the model yield deterministic results and that appropriate rate transition elements are being used. The compilation performed by the compiler 132 also determines actual element connectivity for a model.

A model developed with the editor 110 may include virtual elements, such as input ports and output ports, which may not have a semantic role in the execution of a model. Virtual elements help organize a model graphically. The execution engine 130 may remove some virtual elements in the model and the remaining non-virtual elements may be reconnected to each other appropriately. For example, a multiplexer element provided by Simulink® software is a virtual element that is provided to depict multiplexing a specified number of signals to a smaller number of signals, such as a 2 to 1 multiplexer which receives two input signals, but only has one multiplexed output signal. The compiled version of the model with actual element connections may be used to execute the model. The way in which elements are interconnected in the model does not necessarily define the order in which the equations (execution methods) corresponding to the individual elements are solved (executed).

The execution engine 130 may also include a linking stage 160 that allocates memory necessary for the execution of a model. The linking stage 160 may also produce element execution method execution lists (hereinafter execution lists) that may be used by the execution engine 130 for simulation, trimming, or linearization of the model. The link stage 160 may initialize the model. The initialization of the model may consist of evaluating "setup" execution methods (e.g., element start, initialize, enable, and constant output execution methods). The execution lists may be generated because the simulation and/or linearization of a model may execute element execution methods by type (not by element) when they have a sample hit. For example, a type of execution method may be an output execution method for computing outputs of an element. When there is a sample hit, output execution methods may be executed for the elements in the model. A sample hit may be determined based on a sample time or may be conditional upon some event. For example, an element may have a sample time of one second, such that sample hit occurs every second of simulated time or may be specified such that a sample hit occurs only when a condition is met. In this manner, a sample hit refers to a point in the execution of a model where an element performs an operation using current values available to the element.

After linking has been performed, the execution engine 130 may generate code. To generate code the execution engine 130 may translate the model (or portions of it) into software modules or hardware descriptions (broadly termed code). The generated code may be used during the execution of the model. If code is not generated, the execution engine 130 may use an interpretive mode of execution for the model. In some cases, the user may deploy the code outside the confines of the graphical modeling environment 100.

To execute or simulate the model, the execution engine 130 may use a simulation loop stage 170 to execute the execution methods of elements in a pre-defined ordering upon a sample hit to produce the system responses as they change with time. In another implementation the execution methods may be ordered dynamically based on, for example, the state of the model, a simulation time, etc. For linearization, the graphical modeling environment 100 uses the execution lists in a prescribed fashion to produce a linear state space representation of a system that is described by the model.

One example of the graphical modeling environment 100 may be Simulink® software and the Simulink® software product family that can include, but is not limited to Stateflow®, SimMechanics, SimHydraulics™, SimEvents™, etc., from The MathWorks, Inc. of Natick, Mass.

Although Simulink® software represents one suitable modeling environment for implementing exemplary embodiments, one of ordinary skill in the art will appreciate that exemplary embodiments may be applied to computing environments, such as any graphical modeling, graphical programming, or technical computing environments using software products such as LabVIEW® or MATRIXx from National Instruments, Inc., Mathematica® from Wolfram Research, Inc., Maple™ from Maplesoft, Dymola from Dynasim AB, Extend from Imagine That, Inc., Scilab™ and Scicos from The French National Institution for Research in Computer Science and Control (INRIA), SCADE™ from Esterel Technologies, Inc., among others. Furthermore, one ordinarily skilled in the art will appreciate that exemplary embodiments may apply to other graphical or text-based modeling environments, such as a Unified Modeling Language (UML) modeling environment, a SysML modeling environment, or environments for modeling of physics domains.

Simulink® software provides tools for modeling and simulating a variety of systems such as dynamic systems, in one integrated, graphical environment. Simulink® enables users to design block diagrams that model systems. Simulink® software also enables users to simulate a system model, analyze the performance of the system model, refine the design of the system model, etc. Simulink® software allows users to design system models through a user interface that allows drafting of block diagram models of systems. Blocks in a block library provided by Simulink® software, and/or other programs, are available to users when the users are building a block diagram that models a system. Users may be able to customize some or all model blocks to: (a) reorganize blocks in some custom format, (b) delete blocks they do not use, and (c) add custom blocks they have designed. The blocks may be moved using a human-machine interface (such as a mouse, touchscreen, motion and rotation detector, microphone, or keyboard) from the block library on to the window (i.e., model canvas).

Simulink® software may include a block diagram editor that allows users to perform such actions as drawing, editing, annotating, saving, and printing out block diagram representations of a modeled system. Simulink® software may support a textual interface, such as the textual interface provided in MATLAB®, which allows interaction with a graphical editor. Users may write special scripts that perform automatic editing operations on a block diagram via the textual interface. Simulink® software includes a block diagram execution engine that carries out the task of compiling and linking the block diagram to produce an "in-memory executable" version of the model that is used for generating code, for example single-tasking and multi-tasking code, and/or simulating a block diagram model.

Simulink® software has the ability to simulate discrete (sampled data) systems, including systems whose elements operate at different rates (multirate systems) and/or systems that mix discrete and continuous elements (hybrid systems). Some Simulink® blocks have a SampleTime parameter that specifies the sample time of the block, i.e., the rate at which it executes during simulation. Blocks can have either an explicit or implicit sample time parameter. Continuous blocks are examples of blocks that have an implicit (continuous) sample time. It is possible for a block to have multiple sample times. A block can inherit or infer its sample time from other blocks that are connected to inputs and outputs of the block. The ability to specify sample times on a block-by-block basis, either directly through the SampleTime parameter or indirectly by inheriting or inferring a sample time, enables users to model systems containing discrete elements operating at different rates and hybrid systems containing discrete and continuous elements.

Figure 2A:
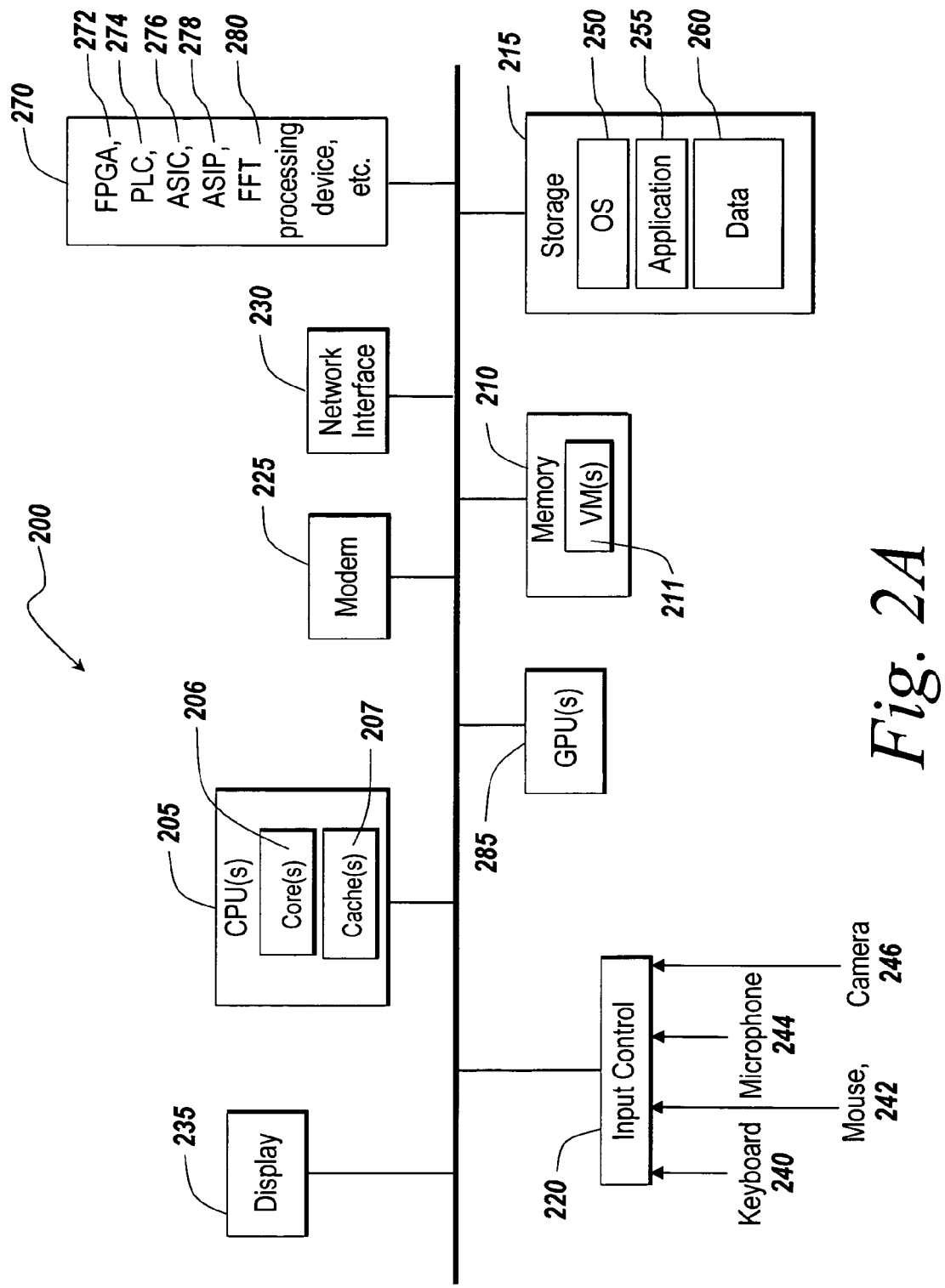
FIG. 2A is a block diagram representation of a computing device suitable for practicing exemplary embodiments.

FIG. 2A is an exemplary computing device 200 suitable for practicing exemplary embodiments. One of ordinary skill in the art will appreciate that the computing device 200 is intended to be illustrative and not limiting. The computing device 200 may take many forms, including but not limited to a personal computer, workstation, server, network computer, quantum computer, optical computer, bio computer, Internet appliance, mobile device, pager, tablet computer, etc.

The computing device 200 may be electronic and may include a Central Processing Unit (CPU) 205, memory 210, storage 215, an input control 220, a modem 225, a network interface 230, a display 235, a graphical processing unit (GPU) 285 and a processor 270. The CPU 205 may control each component of the computing device 200 to provide components of the modeling environment 100. The memory 210 temporarily stores instructions and data and provides them to the CPU 205 so that the CPU 205 operates the computing device 200 and may run components of the modeling environment 100 based on the stored instructions.

Optionally, the computing device 200 may include multiple CPUs 205 for executing software loaded in the memory 210, and other programs for controlling system hardware. Each of the CPUs 205 can be a single or a multiple core processor 206. The code loaded in the memory 210 may run in a virtualized environment, such as in a Virtual Machine (VM) 211. Multiple VMs 211 may be resident on a single processor. Also, part of the application could be run on processors 270, including, for example, a field programmable gate array (FPGA) 272, a programmable logic controller (PLC) 274, an application specific integrated circuit (ASIC) 276, application specific instruction set processor (ASIP) 278, a Fast Fourier Transform (FFT) processing device, etc. Further, the part of the applications may be run on analog electronic devices or other resources may be used to run part of the application, such as the GPU 285.

The storage 215 may contain software tools for applications. The storage 215 can include code 250 for the operating system (OS) of the computing device 200, code 255 for applications running on the operation system including the applications for components of the graphical modeling environment 100. Parts of the applications can be stored in the CPU cache 207 or the memory 210 or they can be stored elsewhere, such as on a remote storage device.

The input control 220 may interface with a keyboard 240, one or more pointing devices (e.g., a mouse 242), a microphone 244, a camera 246 (e.g., a web camera), and/or other input devices, such as, for example, a brain-machine/neural interface. The computing device 200 may receive, through the input control 220, input data, such as the input data for developing a model. The computing device 200 may display on the display 235 user interfaces for displaying the data generated from components of the graphical modeling environment 100.

Figure 2B:
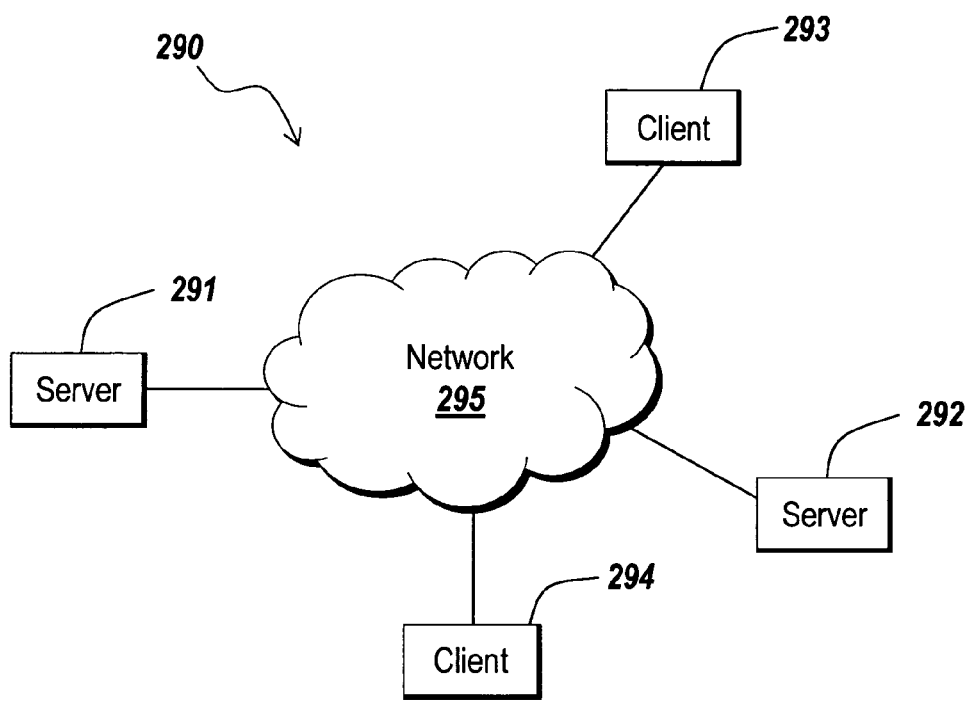
FIG. 2B depicts an exemplary distributed system suitable for practicing a distributed implementation of exemplary embodiments.

FIG. 2B is an exemplary network environment 290 suitable for the distributed implementation of an illustrative embodiment. The network environment 290 may include one or more servers 291 and 292 coupled to clients 293 and 294 via a communication network 295. In one implementation, the servers 291/292 and/or the clients 293/294 can be implemented via the computing device 200. The network interface 230 and the modem 225 of the computing device 200 may enable the servers 291 and 292 to communicate with the clients 293 and 294 through the communication network 295. The communication network 295 may include Internet, intranet, Local Area Network (LAN), Wide Area Network (WAN), Metropolitan Area Network (MAN), Body Area Network (BAN), wireless network (e.g., using IEEE 802.11, IEEE 802.16, or Bluetooth), etc. In addition the network may use middleware, such as Common Object Request Broker Architecture (CORBA) or Distributed Component Object Model (DCOM) to allow a computer on the network 295 to communicate directly with another computer or device that is connected to the network 295. In addition, the communication network 210 may use Remote Method Invocation (RMI) or Remote Procedure Call (RPC) technology. RMI and RPI are exemplary technologies that allow functions, execution methods, procedures, etc., to be called over the environment 200. For example, the clients 230/240 may invoke a method that resides remotely on the servers 220/250.

In the network environment 290, the servers 291 and 292 may provide the clients 293 and 294 with software components or products under a particular condition, such as a license agreement. The software components or products may include licensing agreements for providing components of the graphical modeling environment 100. For example, the client 293 may perform the modeling of a dynamic system using a software component provided by the server 291 and may send the server 291 the model for simulation. The server 291 may return the simulation results to the client 293 and the client 293 may subsequently display the data to the user with the information on the data.

Figure 3:
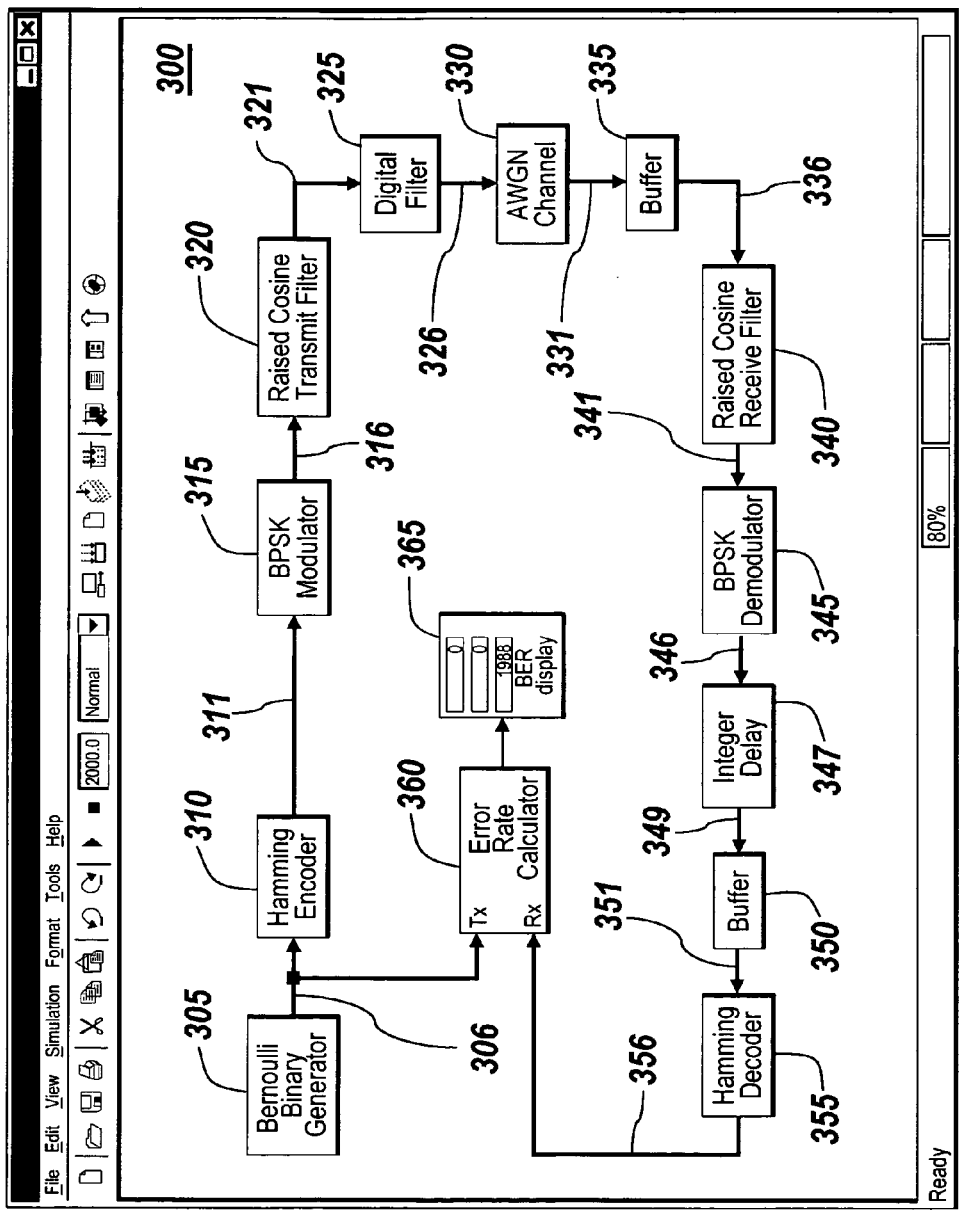
FIG. 3 illustrates an exemplary model implemented in the graphical modeling environment depicted in FIG. 1A.

FIG. 3 is an exemplary model 300 implemented in exemplary embodiments, which may be represented as a graphical model developed with Simulink® software. The model 300 relates to a model of a communication system that determines a bit error rate (BER). The model 300 includes a Bernoulli Binary Generator block 305 (hereinafter Generator 305), a Hamming Encoder block 310, a binary phase shift keying (BPSK) Modulator block 315, a Raised Cosine Transmit Filter (RCTF) block 320, a Digital Filter block 325, an additive white Gaussian noise (AWGN) Channel block 330, a first Buffer block 335, a Raised Cosine Receive Filter (RCRF) block 340, a BPSK Demodulator block 345, a second Buffer block 350, a Hamming Decoder block 355, an Error Rate Calculator block 360, and a BER display block 365.

In simulation, the Generator 305 generates random binary number signals using a Bernoulli distribution. Generator 305 outputs 4-sample frame signals on signal line 306. The signal line 306 connects the generator 305 to the Hamming Encoder block 310 and is used to pass the output of the generator 305 to the input of the Hamming Encoder block 310.

The Hamming Encoder block 310 creates a Hamming code with message length K and codeword length N ($N=2^M-1$), where M is an integer greater than or equal to 3, and K equals N−M. The Hamming Encoder block 310 outputs 7-sample frame signals on signal line 311 with no delay. There is no delay in the Hamming Encoder block 310 because the model 300 is using frame-based processing. The signal line 311 connects the Hamming Encoder block 310 to the BPSK Modulator block 315 and is used to indicate that the 7-sample frame signals are input to the BPSK Modulator block 315.

The BPSK Modulator block 315 modulates the 7-sample frame signals using the binary phase shift keying method and outputs signals that are a baseband representation of the modulated signals on signal line 316. The BPSK Modulator block 315 incurs no delay and does not change the frame size of the output signals.

The RCTF block 320 uses the output signals from the BPSK Modulator block as an input, as indicated by signal line 316. The RCTF block upsamples the output signals from the BPSK Modulator by a factor of 8 to produce 56-sample frame signals with a 32-sample delay. The receive filter introduces a 4 sample offset that gives it an overall 28 sample delay. The signals are input to the digital filter 325 as indicated by signal line 321.

The Digital Filter block 325 filters each channel of the signals received from the RCTF block 320 with a specified digital infinite impulse response (IIR) or finite impulse response (FIR) filter. The Digital Filter block 325 produces signals on signal line 326 as output signals. The Digital Filter block 325 incurs a 4-sample delay, but does not change the frame size of the output signals.

The AWGN Channel block 330 receives the output signals from the Digital Filter block 325 as indicated by signal line 326. The AWGN Channel block 330 adds white Gaussian noise to the input signals on signal line 326. The AWGN Channel block 330 incurs no delay and does not change the frame size of the input signals. The AWGN Channel block 330 outputs signals on signal line 331 that are input of the Buffer block 335.

The first Buffer block 335 re-aggregates the signals received from the AGWN Channel block 330 into output signals on signal line 336 with a new frame size, larger or smaller than the input frame size. The first Buffer block 335 changes the frame size to 64 samples and incurs a 64-sample delay.

The signal line 336 connects the output signals from the first Buffer block 335 to the input of the RCRF block 340. The RCRF block 340 downsamples the signals that are received by a factor of 8 to produce 8-sample frames with a delay of 32 samples and an offset of 4 samples, to incur a net offset of 28 samples, at a new rate as output signals that are output on signal line 341.

The BPSK Demodulator block 345 uses the signals as indicated by signal line 341 as input for processing. Using the binary phase shift keying method, the BPSK Demodulator block 345 demodulates the input signals that were modulated. The BPSK Demodulator block 345 incurs no delay and does not change frame size and outputs signals on signal line 346.

The output signals from the BPSK Demodulator block 345 are input to the Integer Delay block 347, as indicated by signal line 346. The Integer Delay block 347 delays an output of the Integer Delay 347 relative to the input of the Integer Delay 347. In this example, the Integer Delay 347 provides a fixed delay of five samples. The output of the Integer Delay block 347 is input to the second Buffer block 350, as indicated by signal line 349.

The second Buffer block 350 changes the frame size of the signals from the Integer Delay block 347 to 7 samples and incurs a seven sample delay. The second Buffer block outputs signals on signal line 351 to be used as inputs by the Hamming Encoder block 355.

The Hamming Decoder block 355 recovers a binary message vector from a binary Hamming codeword vector. The Hamming Decoder block 355 changes the frame size from 7 samples to 4 samples and outputs signals on signal line 356 to be used as an input by the Error Rate Calculator block 360.

The Error Rate Calculator block 360 compares the output signals on signal line 356 that are output of the Hamming Decoder block 355 with the output signals on signal line 306 from the Generator block 305, and calculates the error rate as a running statistic, by dividing the total number of unequal pairs of data elements by the total number of input data elements from one source. The Error Rate Calculation block 360 inherits the sample time of its input signals.

Although an illustrative embodiment is described relative to frame-based signals that include multiple samples in a frame, one of skill in the art will appreciate that exemplary embodiments may be applied to systems that deal with other types of signals, such as sample-based signals, bus signals that combine a set of signals into a bus, multi-rate signals and multi-dimensional signals.

Figure 4:
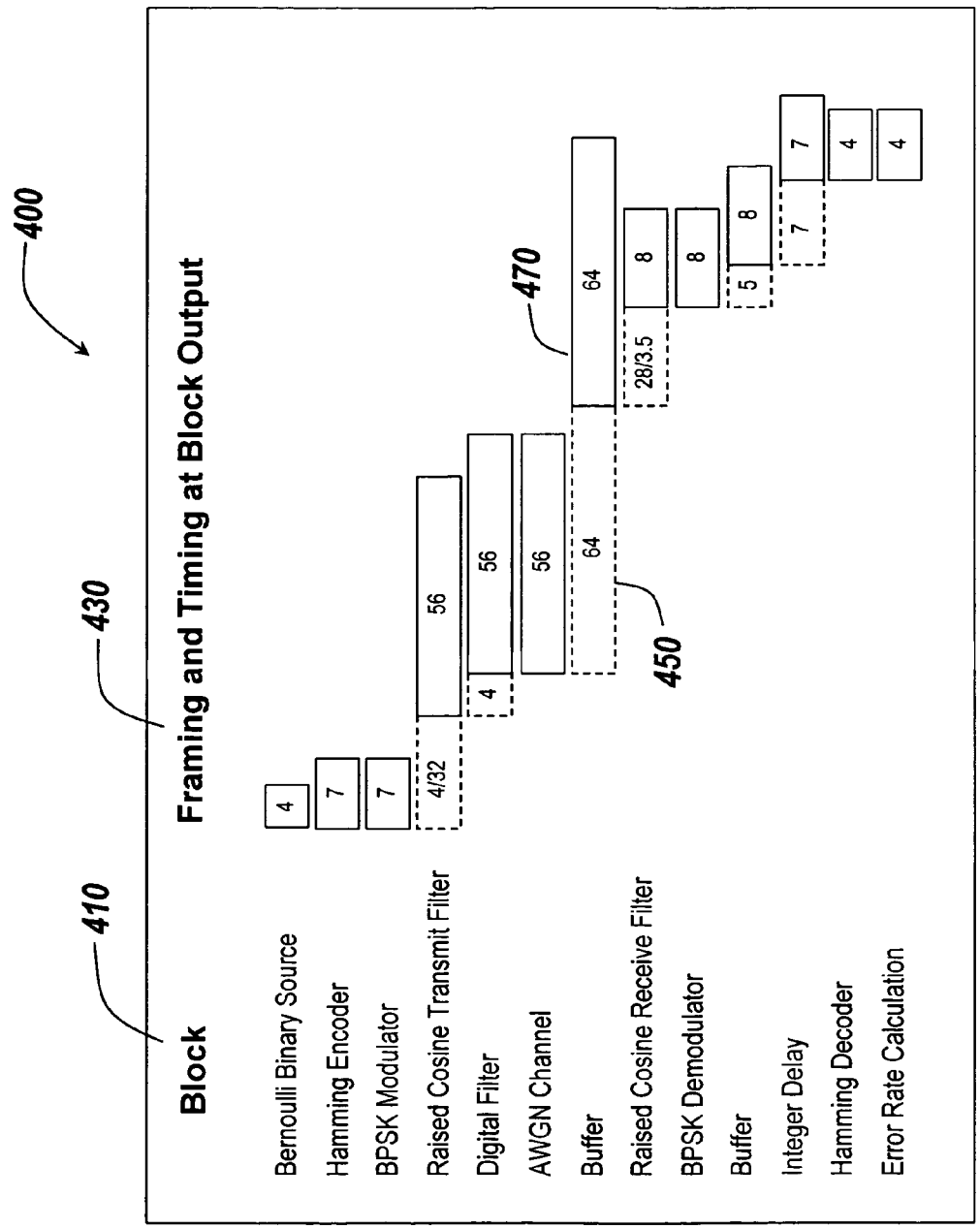
FIG. 4 shows an exemplary Graphical User Interface (GUI) for reporting delay incurred in the model depicted in FIG. 3.

FIG. 4 depicts an exemplary graphical user interface (GUI) 400 for reporting delay incurred along the modeled communication path in the model 300. The GUI 400 provides a list 410 of names that identifies the elements (e.g., block) included in the model 300. The GUI 400 may display and/or allow user interaction with reported delays. The block names may be listed in an order that the blocks of the model 300 are evaluated in, based on their connections, etc. The connecting signal lines between the sorted blocks may be referred to as a signal path along which signals are shared as output from one block to input of the next block. The signal path may be determined when the execution engine 130 compiles the model 300. The GUI 400 also provides framing and timing diagrams 430 displayed in connection with each of the block names listed in the GUI 400. In the framing and timing diagrams 430, each of the blocks listed in the GUI 400 has corresponding framing and timing information. The rectangles with dotted boundaries 450 show the delay incurred in the blocks. The rectangles with solid boundaries 470 show the frame size of the output signals in the blocks. For example, the first Buffer block 335 induces a 64-sample delay and changes output signals to 64 sample frame signals. The delay may be accumulated by adding dotted boundaries from left to right in the framing and timing diagram 430.

Although a specific type of bar charts are employed to display the framing and timing of the model 300 in an illustrative embodiment, substantially any type/format of charts may be employed for displaying the framing and timing of the model 300. One of skill in the art will also appreciate that different colors may be used to indicate the delay and the size of output frames in the framing and timing diagram of the model 300.

For the models of multi-rate systems, the GUI 400 may provide the framing and timing diagram 430 with multi-levels in a hierarchical tree. As used herein, a "multi-rate system" refers to a system that has multiple sample rates. In a model of a multi-rate system, different elements may have various sample rates that may determine the rate at which the elements in the model are executed. Each level of the tree corresponds to a chain of blocks that operate at a particular rate. In the above example, the Bernoulli Binary Generator block 305, the Hamming Encoder block 310, the BPSK Modulator block 315, the second Buffer block 335, the Hamming Decoder block 355, and the Error Rate Calculation block 360 operate at a same primary rate, and the framing and timing diagrams for these blocks are displayed in a same level. On the other hand, the RCTF block 320 and RCRF blocks 340, the Digital Filter block 325, the AWGN Channel block 330, and the first Buffer block 335 operate at an upsampled rate, and the framing and timing diagrams of these blocks may be provided in a different level.

The model 300 may include conditionally executed blocks, such as the Input Switch, Enabled Subsystem, Triggered Subsystem, and Function Call Subsystem provided in Simulink®. The conditionally executed blocks execute on a given condition. For example, the Enabled Subsystem, Triggered Subsystem, and Function Call are not executed unless a control signal for each block (the enable signal, trigger signal and function call, which may be considered an event) has the enabling characteristics. The Input Switch includes multiple input signals and chooses one of the input signals based on a given condition. The blocks that process the switched-off signal do not execute. If the model 300 includes conditionally executed blocks, the reporting mechanism of an illustrative embodiment may display the delay of the model 300 for each possible execution condition. For example, if the model 300 contains Enabled Subsystem, the delay reporting mechanism may provide two displays, such as the framing and timing diagram depicted in FIG. 4, to show the delay profile with the Enabled Subsystem off, and with the Enabled Subsystem on. Alternatively, the delay reporting mechanism may report both sets of delays in one display, but highlight the portion of the display that represents the delays caused by the Enabled Subsystem.

The delay of each block in the model 300 is determined by the algorithm and implementation of the block that is used to produce its output in response to its input. The information on the algorithm of each block may be contained in the block as intrinsic information of the block, such as the attributes and parameters of the block. The delay may be constant for many blocks. Many other blocks may have deterministic delay based on block attributes and parameters. If such information is not known intrinsically by the block, the block may run a small simulation to determine the delay incurred in the block. For example, in the case of an analog or digital filter, the filter's impulse response is known prior to model run time, and the impulse response may be used to generate an accurate estimate of the filter's delay. Alternatively, an intermediate representation may be provided that represents the algorithm of the block. The intermediate representation may be in the form of a control flow graph. This intermediate representation may be used to determine the delay of the block. In another implementation, the algorithm of a block may be provided in the form of another block diagram model, which may contain only blocks with elementary algorithms that are intrinsically provided. More detailed information may be derived as well. For example, an average delay, maximum delay, minimum delay, etc. may be derived, depending on the algorithm and implementation that the block embodies.

Although the examples discussed herein express the delay information in terms of samples, the delay may be represented in terms of other quantities, such as time and frames. The representation of delay in terms of time is advantageous for continuous time systems, such as those dealing with fluid flow, atmospheric pressure, external temperatures, or motor torque. The representation of delay in terms of frames is useful when the signals in the model 300 are a packet-based signal, such as a TCP/IP packet.

Figure 5:
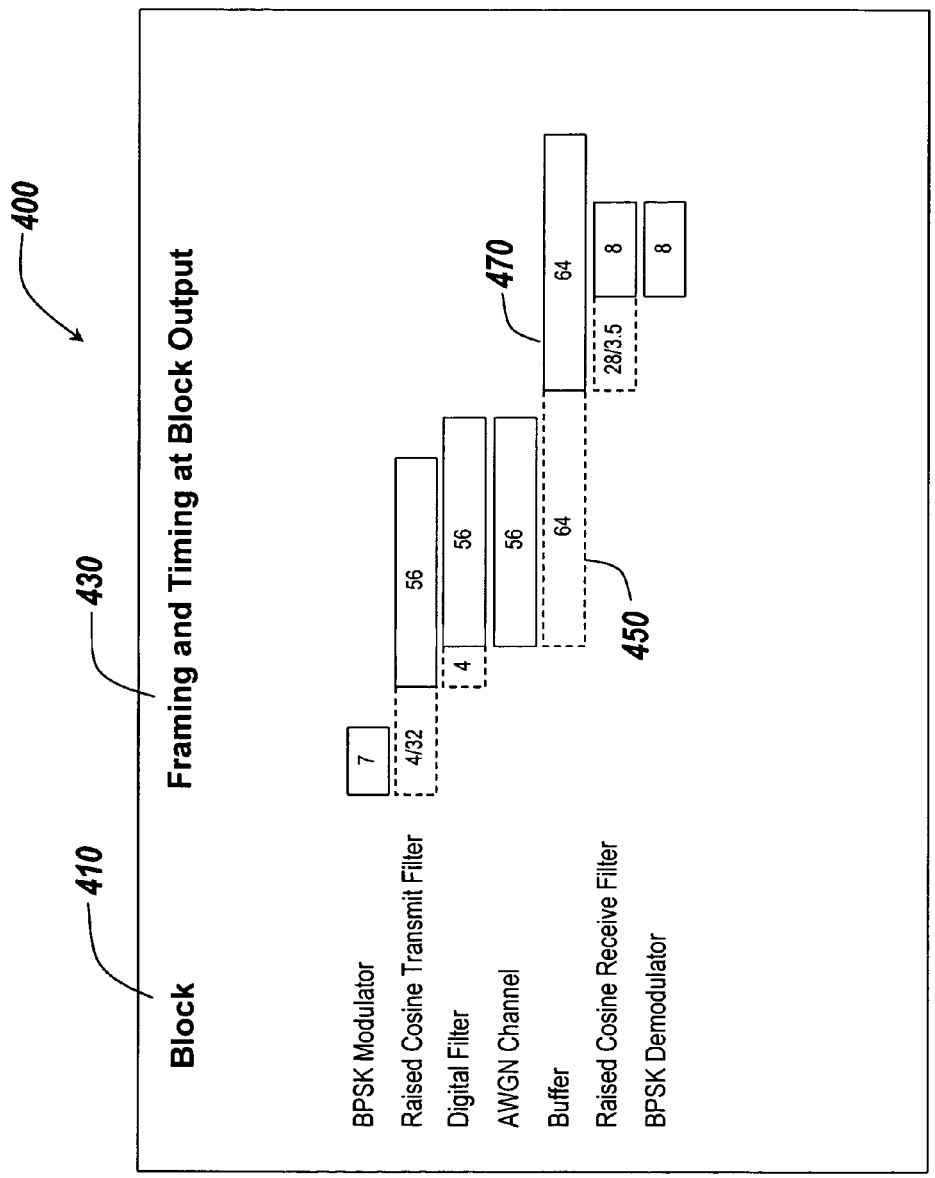
FIG. 5 shows another exemplary GUI for reporting delay incurred in selected elements of the model depicted in FIG. 3.

Although the GUI 400 displays the framing and timing information of all of the elements blocks included in the model 300 in FIG. 4, the GUI 400 may display the framing and timing information on a limited number of elements selected by users. For example, if the users select the BPSK Modulator block 315 and the BPSK Demodulator block 345, the GUI 400 may display the framing and timing information of the BPSK Modulator block 315 and the BPSK Demodulator block 345, or all of the elements between the BPSK Modulator block 315 and the BPSK Demodulator block 345 on the signal path of the model 300, as depicted in FIG. 5.

FIGS. 6A-F depict exemplary GUI 600a-c implementations for depicting delay associated with elements in the model 300. The GUIs 600a-c may include a list 601a-c of block names 602a-c to 614a-c from the model 300. The block names 602a-c correspond to the Generator 305. The block names 603a-c correspond to the Hamming Encoder block 310. The block names 604a-c correspond to the binary phase shift keying (BPSK) Modulator block 315. The block names 605 correspond to the RCTF block 320. The block names 606a-c correspond to the Digital Filter block 325. The block names 607a-c correspond to the AWGN Channel block 330. The block names 608a-c correspond to the first Buffer block 335. The block names 609a-c correspond to the RCRF block 340. The block names 610a-c correspond to the BPSK Demodulator block 345. The block names 611a-c correspond to the Integer Delay block 347. The block names 612a-c correspond to the second Buffer block 350. The block names 612a-c correspond to the Hamming Decoder block 355. The block names 613a-c correspond to the Error Rate Calculator block 360. The block names 614a-c correspond to the BER display block 365.

Each block name 602a-c to 614a-c has at least one associated bar in the GUIs 600a-c. The block names 602a-c to 604a-c are associated with bars 622a-c to bars 624a-c, respectively. The block names 605a-c are associated with bars 625a-c and 625a'-c'. The block names 606a-c to 608a-c are associated with bars 626a-c to bars 628a-c, respectively. The block names 609a-c is associated with bars 629a-c and 629a'-c'. The block names 610a-c to bars 614a-c are associated with bars 630a-c to bars 634a-c. Each of the bars 622a-c to bars 634a-c is marked with thin rectangles 615a-c that represent samples (hereinafter samples 615a-c). Each of the bars 622a-c to bars 634a-c, therefore, represent a number of samples that may be passed through the communication path from the Generator 305 to the Error Rate Calculation block 360.

Figure 6A:
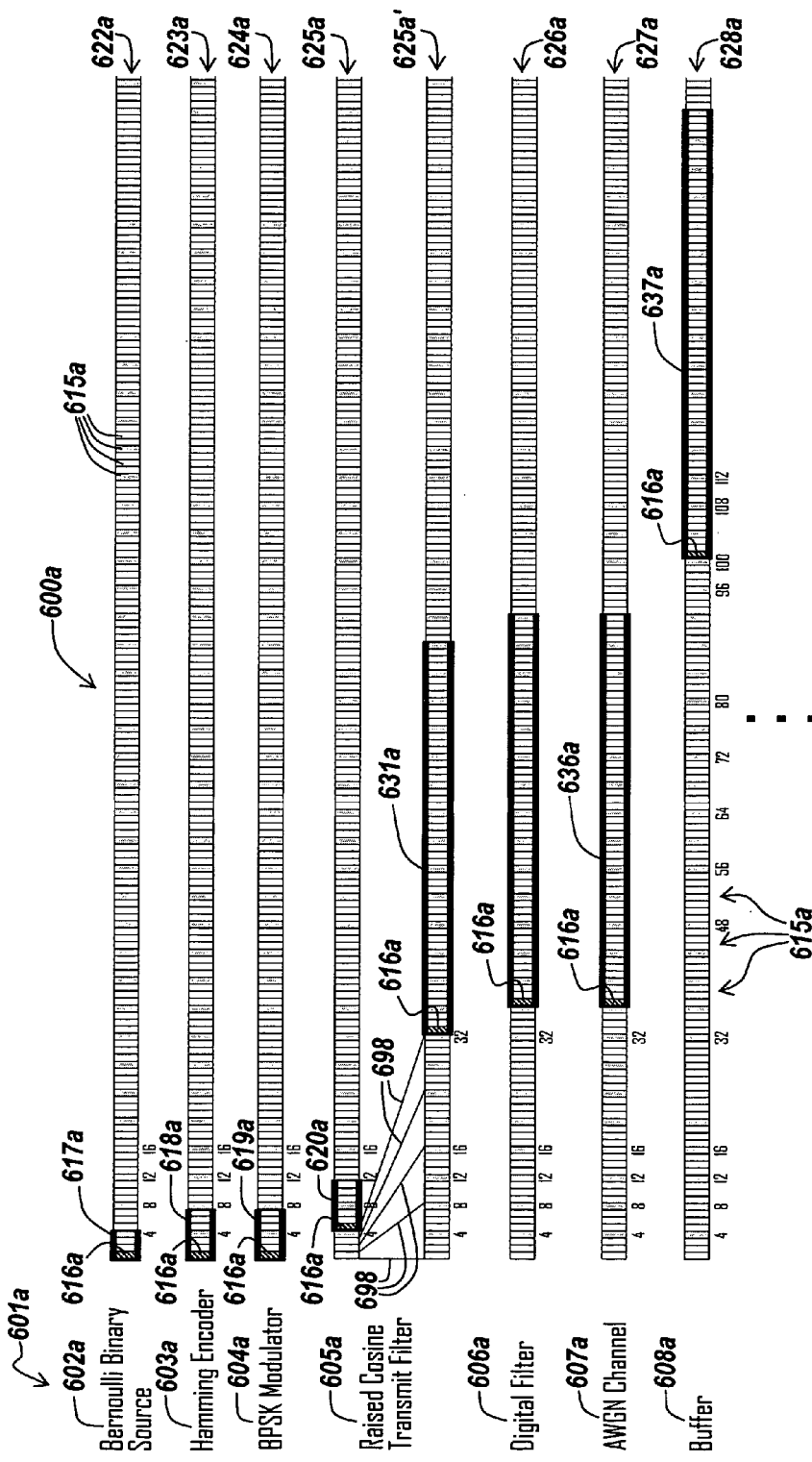
FIGS. 6A-G show other exemplary GUI's for reporting delay incurred in the model of FIG. 3.

Referring to FIG. 6A, the rectangle 616a (hereinafter sample 616a) of the bar 622a represents the first sample to be generated by the Generator 305. The sample 616a may be marked to allow tracking of the delay that the sample associated with the sample 616a experiences while being passed to the Error Rate Calculation block 360. For example, the sample 616a may be shaded with a color, such as red to identify the sample 616a for a user.

A frame of samples is marked by a rectangular outline in each of the bars 622a-634a. The rectangular outline may be a color, such as green, to identify a frame to the users. In the bar 622a, a rectangular outline 617a contains the four samples, and therefore represents four samples that are part of each frame that the Generator 305 generates.

The Hamming Encoder block 310 adds information to the four samples in the frame that was generated by the Generator 305 and produces a frame with seven samples in return, as indicated by the rectangular outline 618a in the bar 623a. The BPSK Modulator block 315 transforms each frame of seven samples produced by the Hamming Encoder block 310 into a new frame of seven samples, as indicated in the corresponding bar 624a. Since the BPSK Modulator does not add any delay or change the frame size, the GUI 600a depicts a rectangular outline 619a that contains seven samples and the sample 616a aligned in the same position as in the bar 618a.

The RCTF block 320 is represented by two bars 625a and 625a'. In the bar 625a, the four-sample delay that is introduced by the filtering operation of the RCTF block 320 is illustrated by a shift in the frame represented as rectangular outline 620a in the bar 625a as well as a shift in the sample represented by sample 616a. To depict this, the GUI 600a shifts the rectangular outline 620a and the sample 616a by four samples in bar 625a with respect to the location of the rectangular outline 619a and sample 616a in the bar 624a.

The bar 625a' represents the upsampling effect of the RCTF block 320. The GUI 600a illustrates how each input sample is upsampled by a factor eight to generate an output frame of size 56 for each input frame of size seven. To illustrate an effect of aggregated delays the upsampling a rectangular outline 621a and the sample 616a are shifted by a factor of 8 with respect to the rectangular outline 620a and the sample 616a in the bar 625a. The rectangular outline 621a also includes 56 samples to represent the new frame size of 56. Lines 698 are provided to illustrate how upsampling shifts samples from the bar 625a to the bar 625a'. While the GUI 600a depicts line 698, the lines 698 may or may not be provided.

After the RCTF block 320, the Digital Filter block 325 introduces another delay, in this case of 4 samples at the higher sample rate that results from the upsampling of the RCTF block 320. The AWGN Channel block 330 introduces no further delay. The Buffer block 335, however, introduces a 64-sample delay, as indicated by a shifted rectangular outline 637a and marked sample 616a in the bar 628a as compared to the rectangular outline 636a and sample 616a in the bar 627a.

Figure 6B:
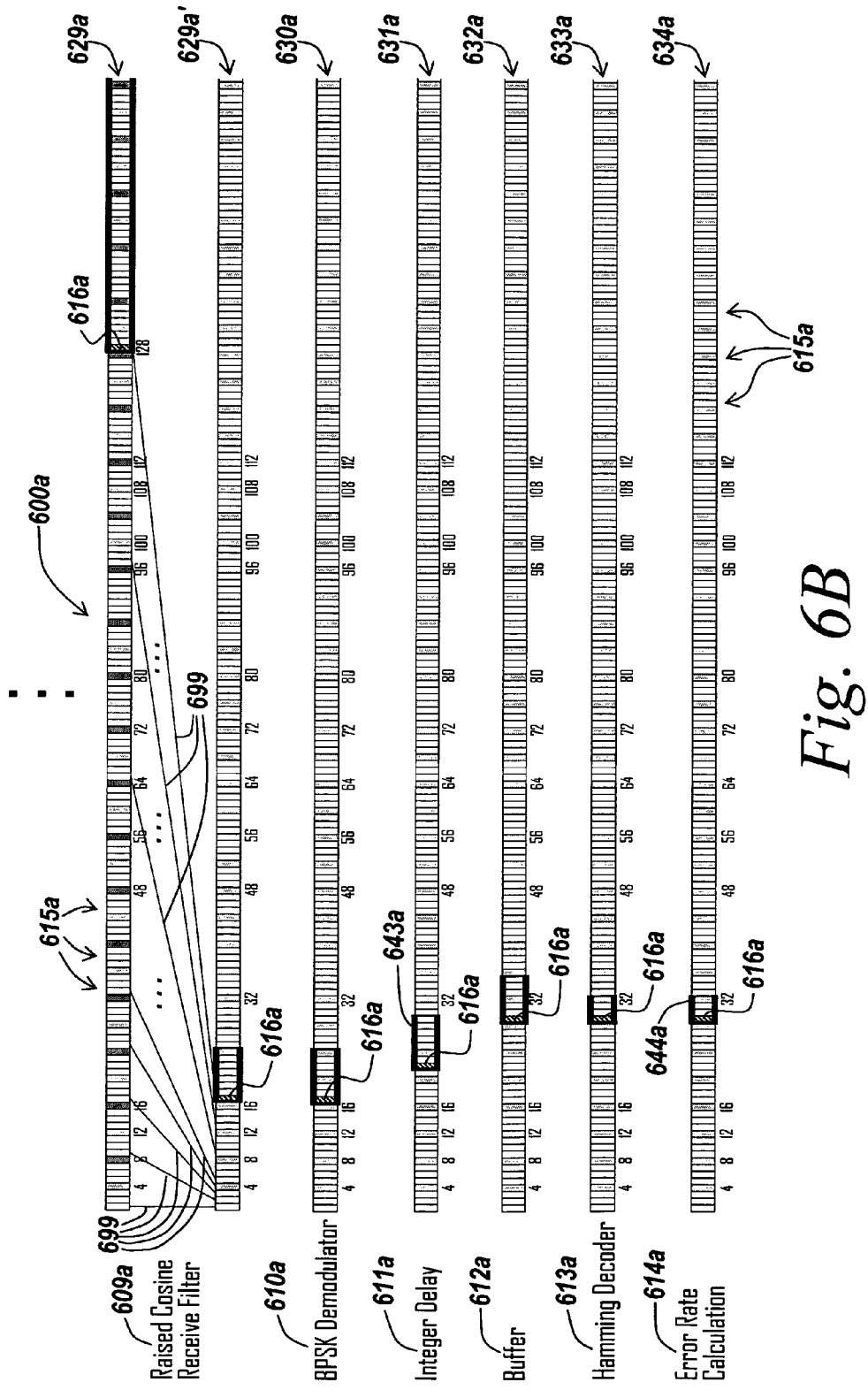

Referring to FIG. 6B, the bars 629a and 629a' represent the effect of the RCRF block 340. The RCRF block 340 adds a delay of 28 samples, which is computed from the 32 samples delay of the RCRF block 340, as determined from a Group delay parameter (which in this example is 4) times the oversampling factor (which in this example is 8). To obtain a delay of 28 samples, an offset of four samples is required by the RCRF block 340 to ensure that the signal is sampled at the right instant. That offset of 4 occurs because it must compensate for the Digital Filter's group delay of 4.

Next, the RCRF block 340 downsamples the input frame by a factor of eight, to produce an output frame with size eight. The downsampling is visualized in the GUI 600 by some additional lines 699 that connect samples between the two corresponding bars 629a and 629a'. Where lines are omitted for clarity, three horizontally following dots are drawn. While the GUI 600a depicts lines 699, the lines 699 may or may not be provided.

The BPSK Demodulator Baseband block 345 that follows does not affect frame size or delay. The Integer Delay block 347, on the other hand, introduces a five-sample delay, as indicated by the shifted rectangular outline 343a in the bar 631a. The Buffer block 350 then changes the frame size from eight back to seven, which introduces a seven-sample delay. The frame size is then further reduced by a Hamming Decoder block 355 to obtain an output frame of size four, which can then be used by the Error Rate Calculation block 360. As shown in the bar 634a that corresponds to the Error Rate Calculation block 360, a rectangular outline 644a contains four samples to represent the frame size of four samples where the sample 616a represents one of the samples.

Figure 6C:
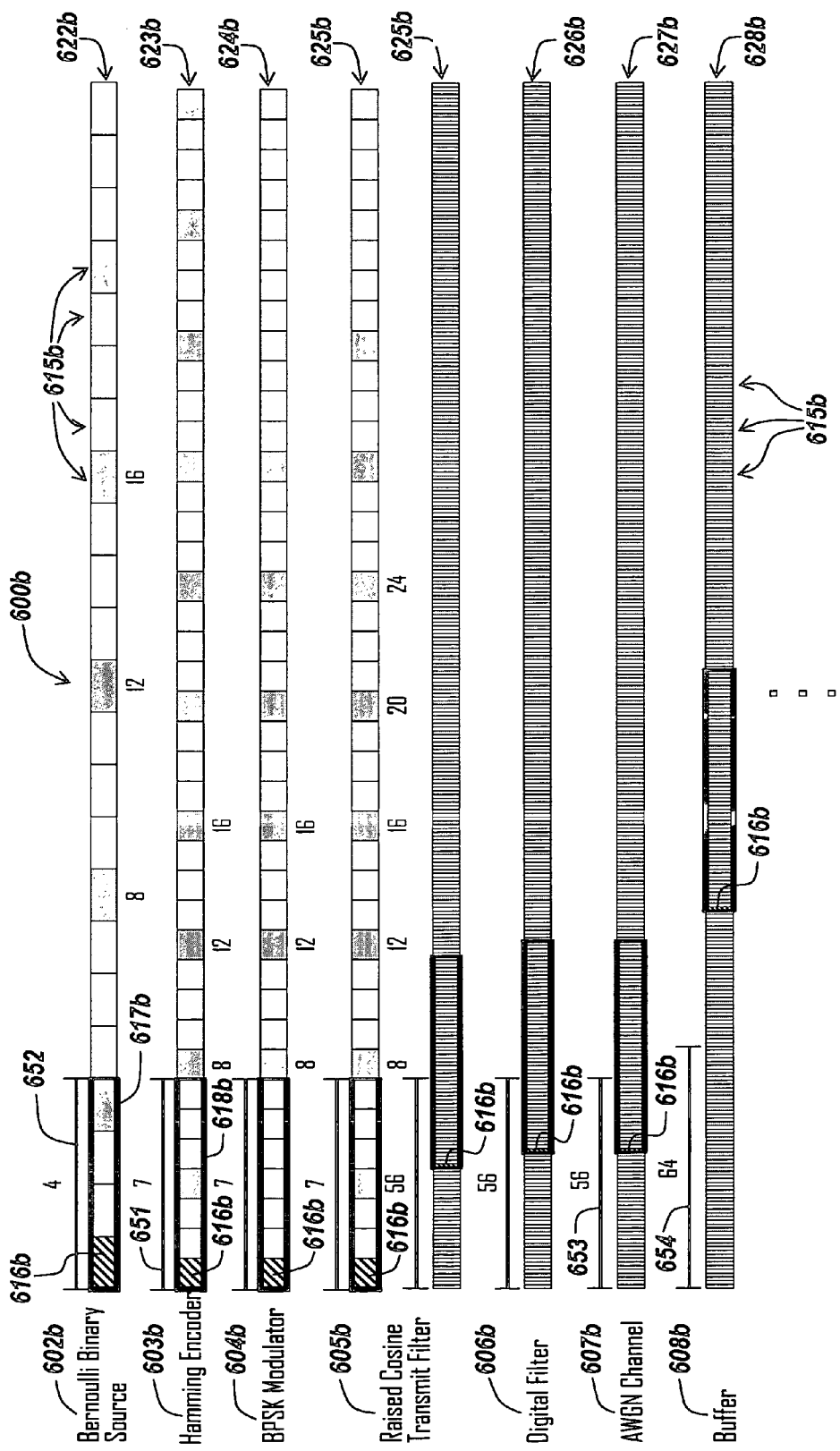
Figure 6D:
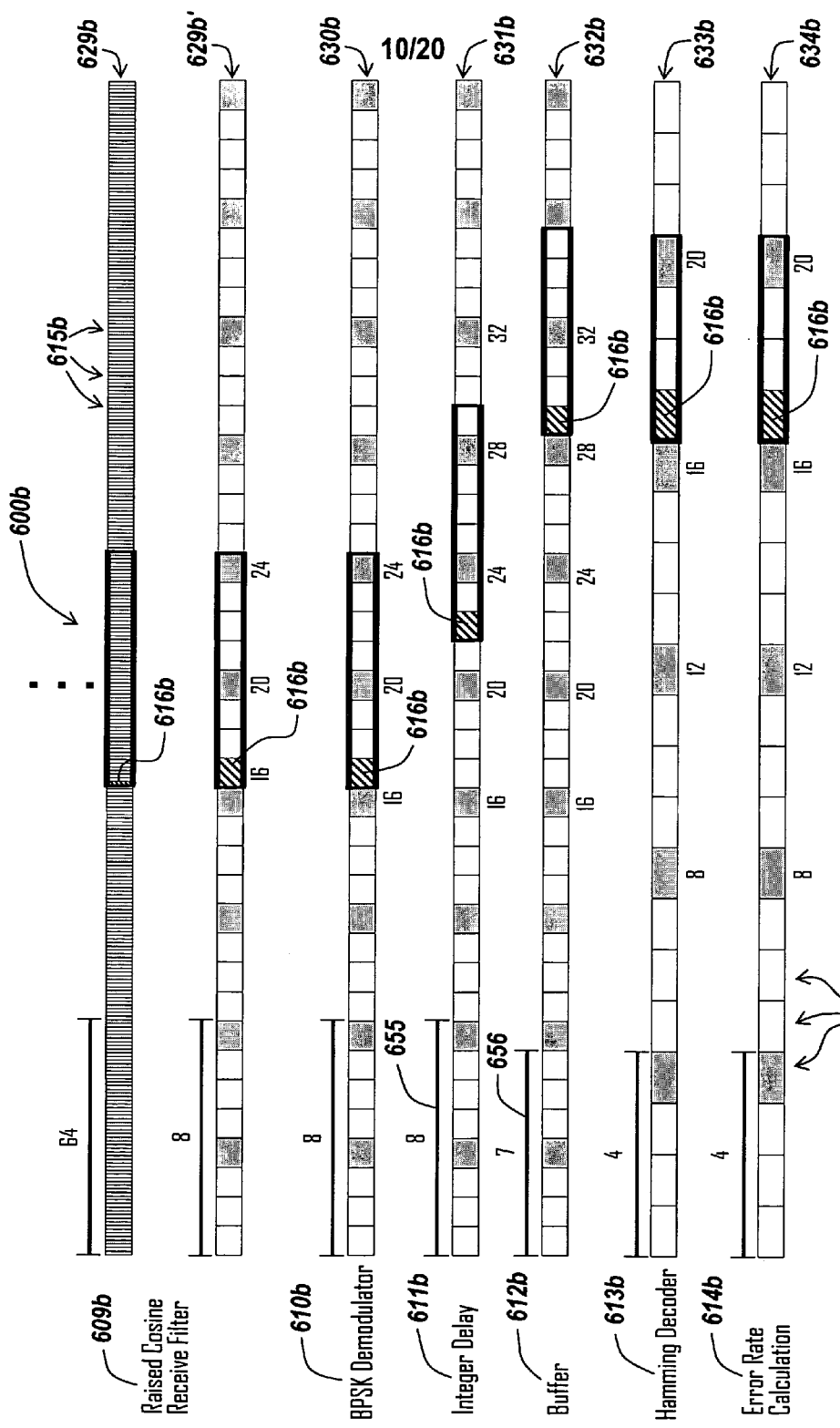

FIGS. 6C-D depict another GUI 600b implementation for depicting delay associated with elements in the model 300. Rectangles 615b (hereinafter samples 615b) that represent samples are scaled to be aligned in time. Referring to FIG. 6C, when the Hamming Encoder block 310 produces a seven-sample frame as an output for each four-sample frame of an input, an implied increase in the sample rate occurs from the input to the output of the Hamming Encoder block 310. The implied increase is based on a constant frame rate from the input to the output. As a consequence, the samples 615b that represents samples in the bar 623b are thinner and occupy less space in the horizontal (time) direction than the samples 615b in the bar 622b to indicate the increased sample rate. The frame width, however, as indicated by a rectangular outline 618b remains aligned with the rectangular outline 617b on the bar 622b. In addition, a marker 651 over the bar 623b remains aligned with a marker 652 over the bar 622b. This shows that the frame rate does not change, while the sample rate increases.

A change in the frame rate can be observed from a bar 627b that corresponds to the AWGN Channel block 330 to a bar 628b that corresponds to the Buffer block 335. In this case, the frame size increase from 56 to 64, as represented by markers 653 and 654, respectively, and the width of the marker 654 increase as compared to width of the marker 653 because the sample rate does not change and thus the width of the samples 615b remains the same between bar 627b and 628b. The increase in the frame width indicates that the frame has an increased time span.

Another example where the frame size and width change is depicted in FIG. 6D and relates to the operation of the Buffer 335. As depicted in FIG. 6D, a change in the frame rate can be observed from a bar 631b that corresponds to the Integer Delay block 347 to a bar 632b that corresponds to the Buffer block 350. In this case, the frame size decrease from 8 to 7, as represented by markers 655 and 656, respectively, and the width of the marker 656 decreases as compared to width of the marker 655. The decrease in the frame width indicates that the frame has a decreased time span.

Figure 6E:
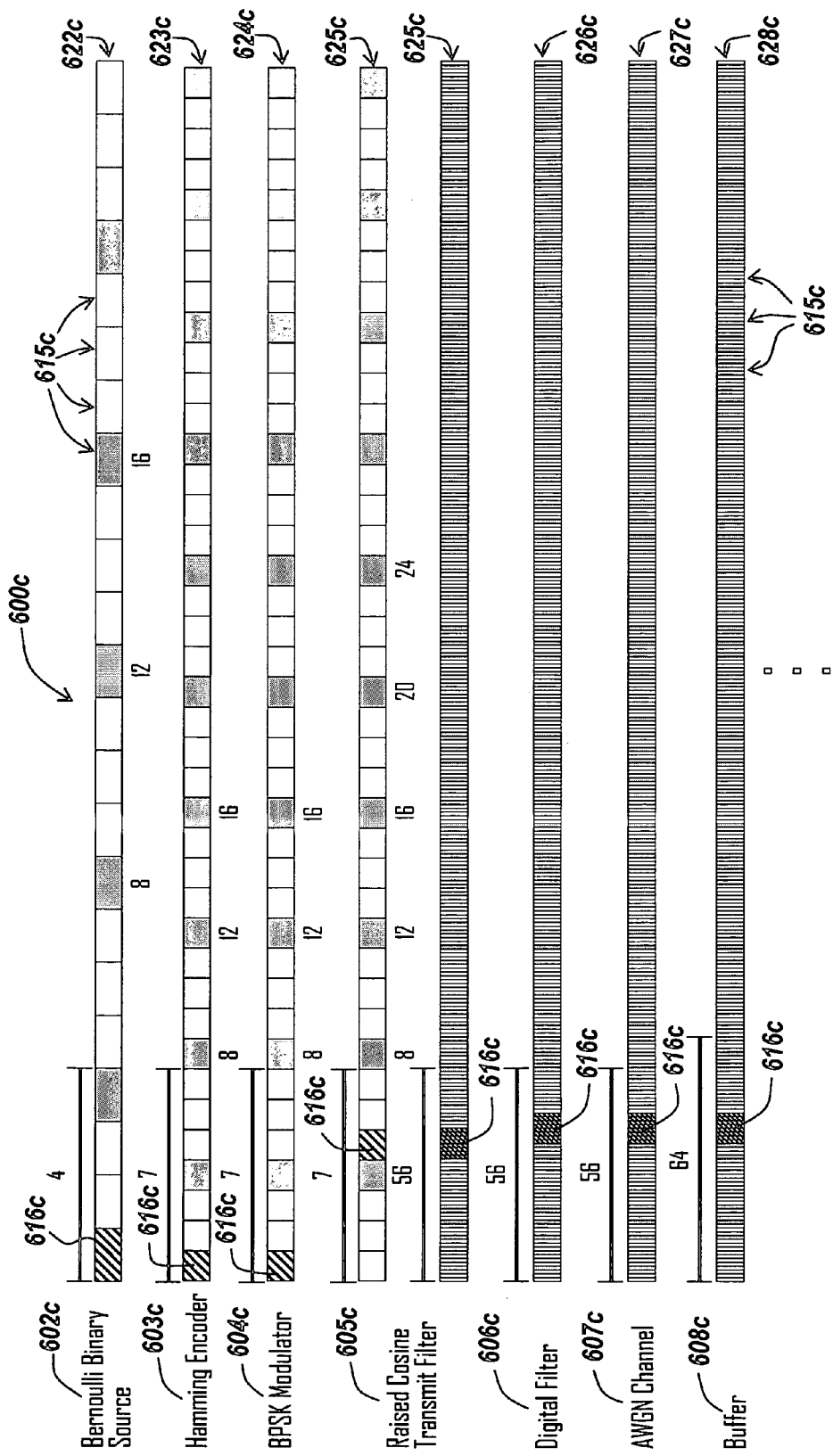
Figure 6F:
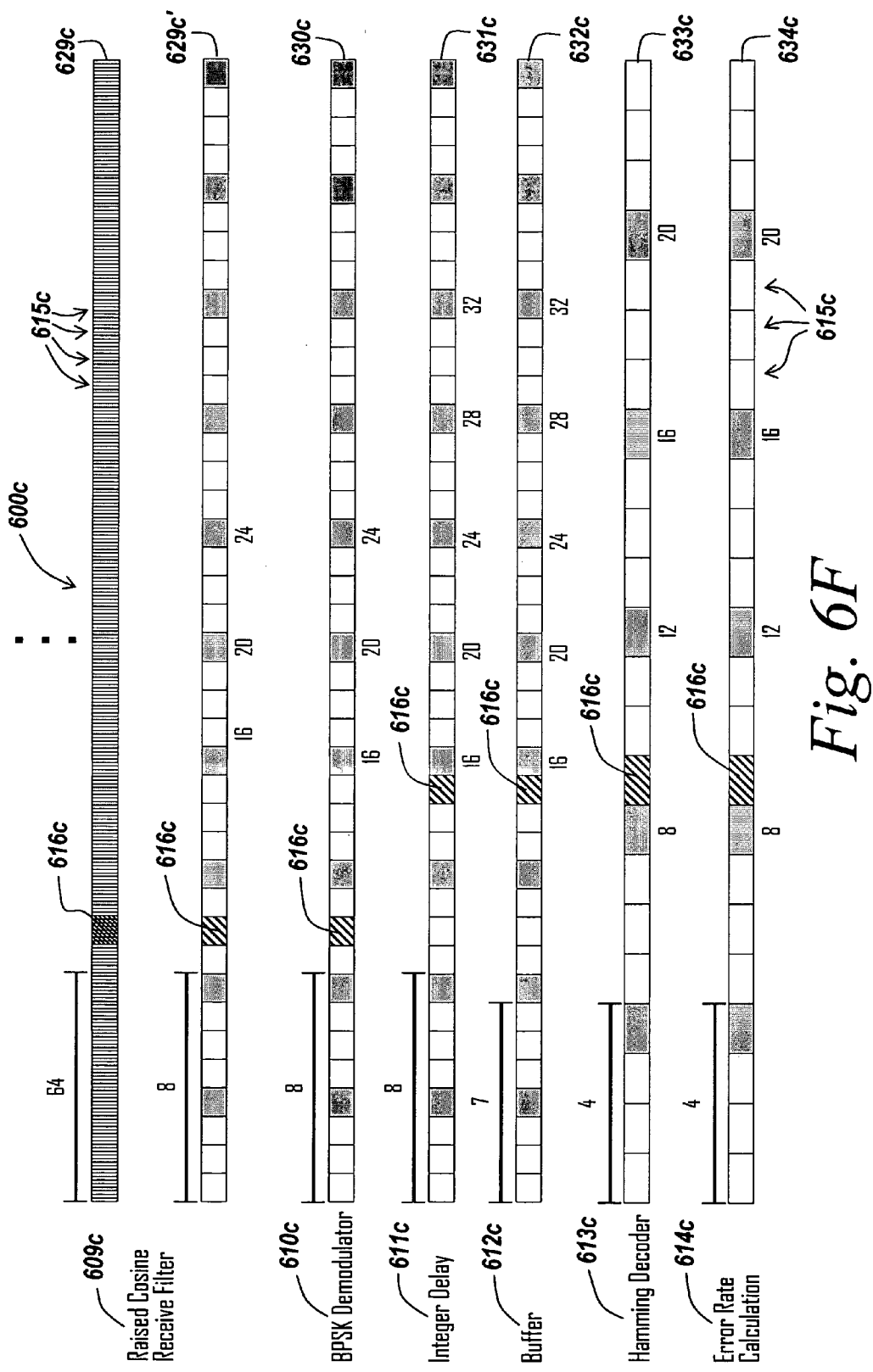

FIGS. 6E-F depict yet another exemplary GUI 600c implementation for depicting delay associated with elements in the model 300. FIGS. 6E-F differentiate the overall delay into two components, an algorithmic and a computational delay component. Here, an algorithmic delay is a delay that is associated with the algorithm an element uses when performing an operation. The algorithmic delay may vary depending on what algorithms are used in an element. A computational delay refers here to a delay that corresponds to a delay that is associated with the environment in which a model is developed.

The algorithmic delay, such as a delay incurred by a smoothing operation, is shown here by the shaded one or more samples 616c that corresponds to a sample in the model 300. The one or more samples 616c may be shaded with a color, shading, pattern, or other graphical indicator that distinguishes the sample from other samples 615c in the GUI 600c. In addition, the one or more samples 616c capture semantic units of samples, so that, for example, interpolation results in an increase in a number of the one or more samples 616c that are shaded. This is illustrated by the two bars 625c and 625c' that correspond to the RCTF block 320, where one sample on the input is interpolated into eight on the output. The bar 625c includes only one of the one or more samples 616c as being shaded, which corresponds to one sample on the input of the RCTF block 320. The bar 625c' includes eight samples of the one or more samples 616c as being shaded, which corresponds to eight interpolated samples on the output of the RCTF block 320.

Likewise, but conversely, for the RCRF 340, eight samples on the input are reconstructed into one sample on the output as shown on bars 629c and 629c' of FIG. 6F. This is in contrast with operations where the number of samples changes because of adding or removing parity bits, as is illustrated by the Hamming Encoder block 310 and Hamming Decoder block 355.

The differentiation between algorithmic and computational delay may be illustrated by the samples 616c that are shaded in bar 628c that corresponds to the first Buffer block 335. The first Buffer block 335 introduces a 64 sample computational delay, but because this is separated from the algorithmic delay, the one or more samples 616c that are shaded do not show an additional delay as compared to the one or more samples 616c that are shaded in the bar 627c.

Bars 628c and 629c illustrate that a four-sample offset in the RCRF block 340 is required because a translation of the one or more samples 616c (in this there are eight shaded samples) in the bar 629c, with an algorithmic delay of 32, would partially overlap two samples (i.e. two of the one or more samples 616c) in the bar 629c'. Therefore, to align the samples (i.e. the one or more samples 616c), a four sample offset is required in the RCRF block 340 that results in an overall delay of 28.

Information in FIGS. 6A-F may relate back to the model 300. For example, the required offset for the RCFR block 340 can be indicated by the user with one of the GUIs 600a-c. Alternatively, the required offset may be automatically determined from a delay analysis, and the offset obtained can be set as the corresponding property of the RCFR block 340.

FIGS. 6A-F may depict a relative and/or an absolute delay. As an example of relative delay, in FIG. 6B, sample 616a in bar 631a is shifted by five samples 615a relative to sample 616a in bar 630a. This shift represents a relative delay between an input of the Integer Delay block 347 and an output of the Integer Delay block 347. As an example of absolute delay, in FIG. 6A, sample 616a in bar 622a represent a zero absolute delay. The sample 616a in bar 626a represents an absolute delay of 36 samples.

Figure 6G:
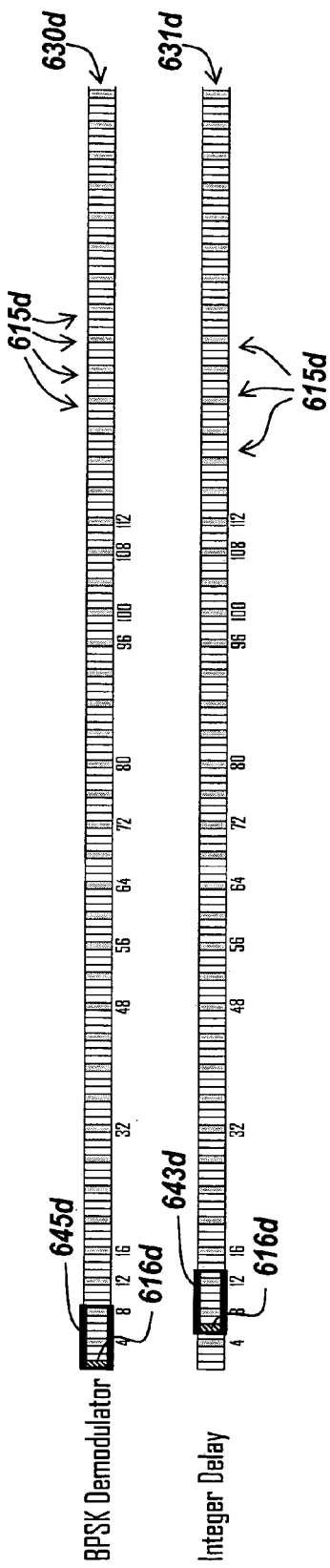

FIG. 6G depicts GUI 600d that provides a graphical representation of relative delay independent of absolute delay. Bar 630d corresponds to the BPSK Demodulator block 345 and includes samples 615d. A sample 616d is shaded to indicate a relative delay for the BPSK demodulator block 345, which in this case is zero. Rectangular outline 645d represents a frame that may be processed by BPSK Demodulator block 345. In some instances, the rectangular outline 645d may not be depicted in the GUI 600d. Bar 631d corresponds to the Integer Delay block 347 and includes samples 615d. The sample 616d is shaded to indicate a relative delay for the Integer Delay block 347, which in this case is five. Rectangular outline 643d represents a frame that may be processed by Integer Delay block 347. In some instances, the rectangular outline 643d may not be depicted in the GUI 600d.

In another implementation, interaction between the delay analysis in one of the GUIs 400 and 600a-d and the model 300 may include changing the frame size of elements in the model 300 in response to a resizing the frame size in one of the GUIs 400 and 600a-d. For example, the user may drag the left or right edge of a rectangular outline (e.g., 621a, 635a, etc.) to resize the rectangular outline. The frame size corresponding to the rectangular outline can then be adjusted in the model 300.

In yet another implementation, interaction between the delay analysis in one of the GUIs 400 and 600a-d and the model 300 may include changing the model 300 when the samples 616a-d corresponding to the samples or aggregations of samples are changed. For example by dragging the mouse to change the size of a sample that represents a sample or by click operations such as, for example one click on the original right-hand edge and then another click on the newly desired location, a new sample rate may be generated for a corresponding element.

The GUIs 400 and 600a-d may employ a grid and a feature to have the resultant of interactions snap to the grid. The GUIs 400 and 600a-d may employ guidelines and a snap to guideline feature. The GUI's 400 and 600a-d may also employ multi-select options, where, for example, multiple frame markers can be modified simultaneously.

In addition, the GUIs 400 and 600a-d may be linked to the model 300 so that user interaction with one results in an operation that involves the other. For example, when the user clicks on one of the bars (e.g., 622a-c to 634a-c) that are displayed, the corresponding block in the model 300 may be displayed or otherwise identified for the user or the corresponding block parameters dialog may be displayed, etc. The user may also indicate in the model 300 that the delay representation in one of the GUIs 400 and 600a-d, such as one or multiple bars (e.g., 622a-c to 634a-c), be marked in one of the GUIs 400 and 600a-d.

In still other implementations, GUIs 400 and 600a-d may include, for example, a number of lines that represent axes along which the delays may be shown, along which the samples may be shown, along which the frames may be shown, etc.

Editing operations in either the model 300 or the GUIs 400 and 600a-d may have an effect in the other. For example, when a user deletes the representation of the Integer Delay block 347 in one of the GUIs 400 and 600a-d, the corresponding element in the model 300 may be removed.

The representation of the delay analysis in the GUIs 400 and 600a-d may be customizable. In one example, the user may choose to see certain blocks near the top of the list (e.g., the list 601a) of block names. In another example, the format of the GUIs 400 and 600a-d may be different such that, for example, the bars in the GUIs 400 and 600a-d extend vertical instead of horizontally and the list (e.g., the list 601a) of block names may be horizontal instead of vertical.

Further, multiple paths in the model 300 may be selected for delay analysis. These paths may be completely or partially overlapping and the delay analysis for the multiple paths may be displayed in a single GUI (e.g., GUI 400, GUI 600a, GUI 600b, GUI 600c, GUI 600d) or multiple GUIs (e.g., GUIs GUI 400, 600a, 600b, GUI 600c and/or 600d).

Figure 7:
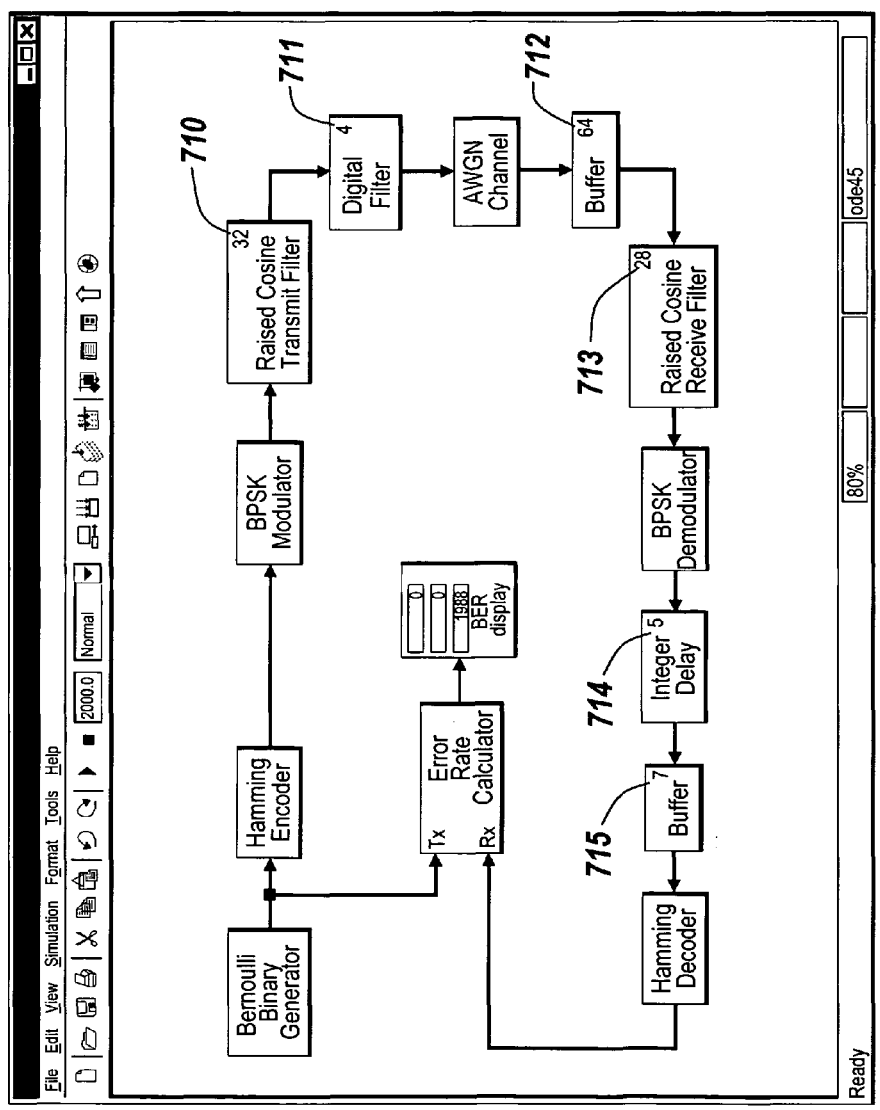
FIG. 7 depicts the exemplary model depicted in FIG. 4 where information about the delay incurred by elements is displayed in connection with the representation of the elements.

FIG. 7 depicts another embodiment for reporting delays incurred in the model 300. The information on the delay incurred in the model 300 is displayed in connection with the representation of the blocks that incur the delay. The blocks that incur the delay, such as the RCTF block 320, the Digital Filter block 325, the first Buffer block 335, the RCRF block 340, the Integer Delay block 347 and the second Buffer block 350 include sample numbers 710-715 within the blocks that represent the delay incurred in each of the blocks.

In further embodiments, delays incurred in the model 300 may be reported by providing a color scheme for graphical affordances in the model 300. For example, referring to FIG. 3, the RCTF block 320, which has a delay of 32 samples, may change from an original color to another color. The entire block 320 may change color, only the border may change color, a drop-down shadow with a certain color may appear, etc. Alternatively, signals represented by signal lines connecting blocks in the model 300 change color to indicate a delay. The color may correspond to a specific delay. For example, a delay of 28 samples may correspond to the color red. In this case, the RCRF block 340, therefore, is represented as a red block.

Each block that incurs a delay may change to a color that corresponds to a delay or the signal lines associated with each element may change color. For example, the Digital Filter block 325 and the RCTF block 320 incur the same amount of delay of 4 samples (before upsampling of the RCTF block 320). In this case, both the block 325 and the block 320 may be represented with the same color, thereby indicating that the block 325 and the block 320 incur the same amount of delay. Alternatively, signal lines 326 and 321 of the block 325 and 320, respectively, may change colors to indicate the delay. In this case, the output signal lines 326 and 321 may be represented with the same color.

In another example, each color may correspond to a range of delay values, such that multiple elements that have different delays, but are within a given delay range, can be represented by the same color, or alternatively, the signal lines corresponding to the elements within the given delay range can be represented by the same color. For example, the blocks 325 and 320 incur a delay of 4 samples, while the Buffer block 350 incurs a delay of 5 samples. In the present example, the color blue may be used to indicate block that incur a delay within a range of 1 to 10 samples. In this case, the blocks 325, 320 and 350 are all represented by the color blue or the signal lines 326, 321 and 351 can be represented by the color blue.

The delays discussed above are represented as relative delays. That is, the delay represents an amount of time, samples, frames, etc., by which the output of an element lags the input of an element. For example, referring to FIG. 3, it is observed that the output of block 325 has a delay of 4 samples relative to the input of the block 325. It is also observed, that the input of block 325 is dependent on the output of block 320. The delay of block 325, therefore, represents an amount of delay added to the system model by the block 325.

Exemplary embodiments may allow a user to trace the accumulation of delay through a system by changing the color intensity of each element or signal in a model that is located in a path of the model that incurs a delay.

For example, the block 320 represents the first block in the model 300 to incur a delay. In this case, the block 320 and all the blocks occurring in the path after the block 320 may change their color to a light red. The block 325 adds a delay of 4 samples relative to the block 320. As a result of this additional delay, the block 325 changes its color intensity and the color intensity of all of the blocks in the path after the block 325 to a slightly darker shade of red than that of the block 320. It is observed that the block 330 does not add any delay to the model, and therefore, the color intensity remains the same as the color intensity provided by block 325.

The next block (block 335), incurs a delay of 64 samples, and therefore the intensity of the color changes to a darker shade of red than the previous block 330. This color scheme can continue until the end of the path, which in this case occurs at block 360. The color intensity scheme may alternatively be applied to the signals that correspond to the blocks, such that as the delay accumulates the color intensity of the signals in the path changes. This color scheme results in a block diagram that indicates an accumulation of delay through a path by displaying a spectrum of color intensities.

In another example, some embodiments may provide an array of colors to indicate the accumulation of delays. For example, an array of colors may be provided from black to red, where black indicates that no delay has been accumulated and red indicates the total accumulation of delay. This color scheme may be implemented in the same fashion as the color scheme that employs varying color intensities to indicate accumulated delay, e.g., employing a heat map color spectrum.

The block 320, representing the first block that incurs a delay in the model and all the blocks occurring in the path after the block 320 may change their color to blue. The block 325 adds a delay of 4 samples relative to the block 320, and as a result, the block 325 changes its color and the color of all of the blocks in the path after the block 325 to green. The block 330 does not add any delay to the model, and therefore, the color of block 330 and all other block occurring after block 330 remains green. The next block (block 335), incurs a delay of 64 samples, and therefore, the color of the block 335 and all the block occurring after block 335 change their color to yellow.

Alternatively, rather than changing the colors of the block the signals corresponding to the blocks can be changed such that as the delay accumulates the color intensity of the signals change. This color scheme can continue until the end of the path, and the colors will continue to change along the path according to the accumulated delay. This color scheme results in a block diagram that indicates an accumulation of delay through a path by displaying an array of colors.

Exemplary embodiments may also allow an absolute delay to be reported. An absolute delay refers to a total amount of delay that has accumulated up to a certain point in a model. For example, referring again to FIG. 3, the block 320 incurs a relative delay of 32 samples. The delay up to block 320 from the block 305 (i.e., the absolute delay) is also 32 samples because the blocks 305, 310 and 315 do not incur any delay. The block 325, however, adds a relative delay of 4 samples. The absolute delay up to the block 325 is the total accumulated delay, which in this case is an absolute delay of 36 samples. The absolute delay may be depicted in the blocks of a model in the same manner that the relative delays are depicted in FIG. 7. Further, the coloring schemes discussed above can be applied to represent the absolute delay.

Exemplary embodiments may depict both relative and absolute delays in a model. For example, some blocks in a model may indicate a relative delay, while other blocks in the model may indicate an absolute delay. In one implementation, the relative delays may be indicated using a color scheme that includes a certain set of colors. The colors may include for example various intensities of reds and yellows. The absolute delays may be indicated using a color scheme that includes another set of colors, such as various intensities of blues and greens.

After the delay incurred in the model is calculated, compensation of the delays may be performed based on the calculated amount of the delay. Because systems with delay compensation must be causal, the signals delayed in the model cannot be advanced. Instead, exemplary embodiments insert one or more compensation elements that incur additional delay for compensating for the delay incurred in the model. The additional delay is added such that the frame boundaries of signals are preserved. That is, if any existing elements in the model incur a delay, a further delay is added such that total delay is an integer number of frames.

The compensation can be applied to all or part of the model. For example, the model may include a subsystem and the compensation may be applied to elements in the subsystem. A subsystem allows a user to provide layers of models within the model to facilitate containment, separation and/or nesting for a part of the model. A subsystem may accept inputs from other elements in the model and may provide outputs to be used by the model. Elements in the subsystem may incur delays that can be compensated independently from other elements in the model. A subsystem may be a reference to a library element or another model.

Figure 8A:
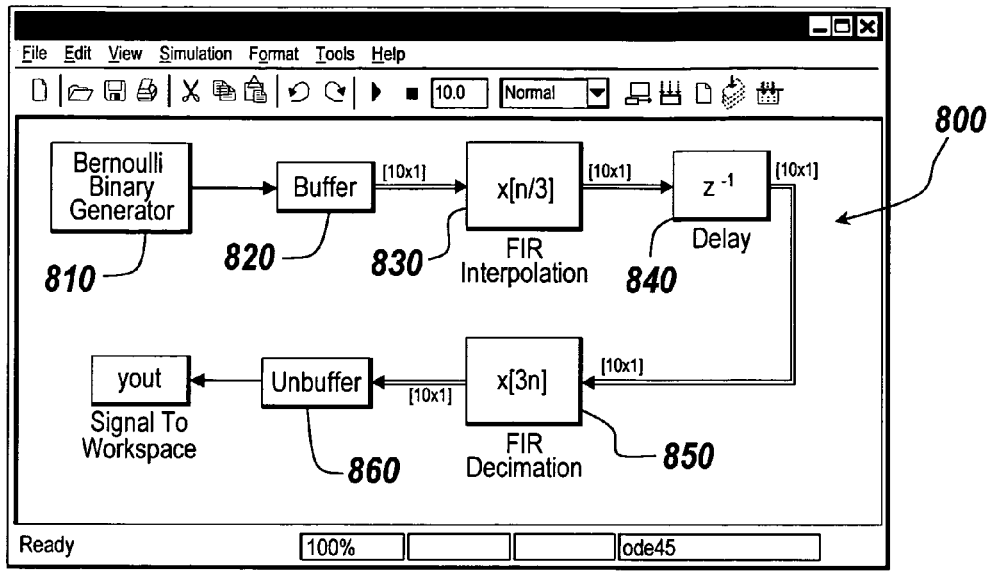
FIG. 8A depicts an exemplary model to illustrate model-wide delay compensation.

Some embodiments provide a model-wide delay compensation option as well as an element-by-element delay compensation option. FIG. 8A depicts an exemplary model 800 to illustrate model-wide delay compensation. The model 800 includes a Bernoulli Binary Generator block 810, a Buffer block 820, an FIR Interpolation block 830, a Delay block 840, an FIR Decimation block 850 and an Unbuffer block 860. The model 800 is a multi-rate system because the FIR Interpolation block 830 samples the discrete-time input at a rate L times faster than the input sample rate, where the integer L is specified by an interpolation factor parameter, and the FIR Decimation block 850 samples discrete-time input signals at a rate K times slower than the input sample rate, where the integer K is specified by a decimation factor parameter. The FIR Interpolation block 830 and the FIR Decimation block 850 are duals of each other in the model 800. Delay incurs at the delay block 840, which operates at a high rate and the delay should be compensated for at the high rate, that is, prior to the FIR Decimation block 850. If delay is incurred in multiple blocks that operate at multiple rates, the numerical delay on these blocks cannot simply be added together to determine the end-to-end delay of the model.

In order to compensate for the delay, users may right click on the "white space" of the model 800 to bring up a menu for model-wide options that may include a model-wide delay compensation option. The users may also click on a "Tools" menu in the menu bar to bring up the model-wide delay compensation option. If the users select the model-wide delay compensation option, a user interface, such as depicted in FIG. 8B, is provided for the users to set up the parameters of the model-wide delay compensation option. In the graphical user interface depicted in FIG. 8B, the users may be provided with a query 870 whether the users want automatic compensation or to confirm the addition of each new compensation block for each delay block in the model. The users may also be provided with an option 880 to select the color of additional delay blocks in order to differentiate them from delay blocks already present in the model.

Figure 8C:
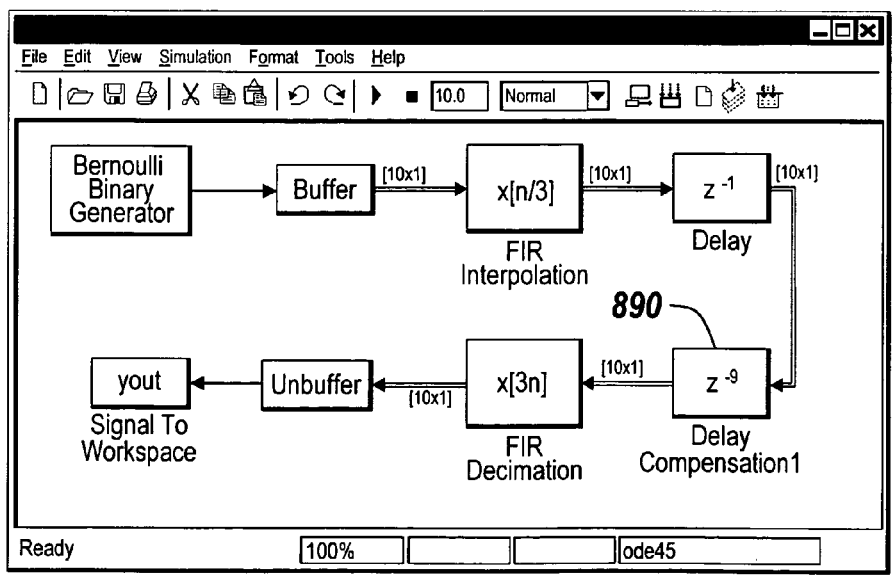
FIG. 8C shows an exemplary compensation element that can be automatically inserted into the model.
Figure 8B:
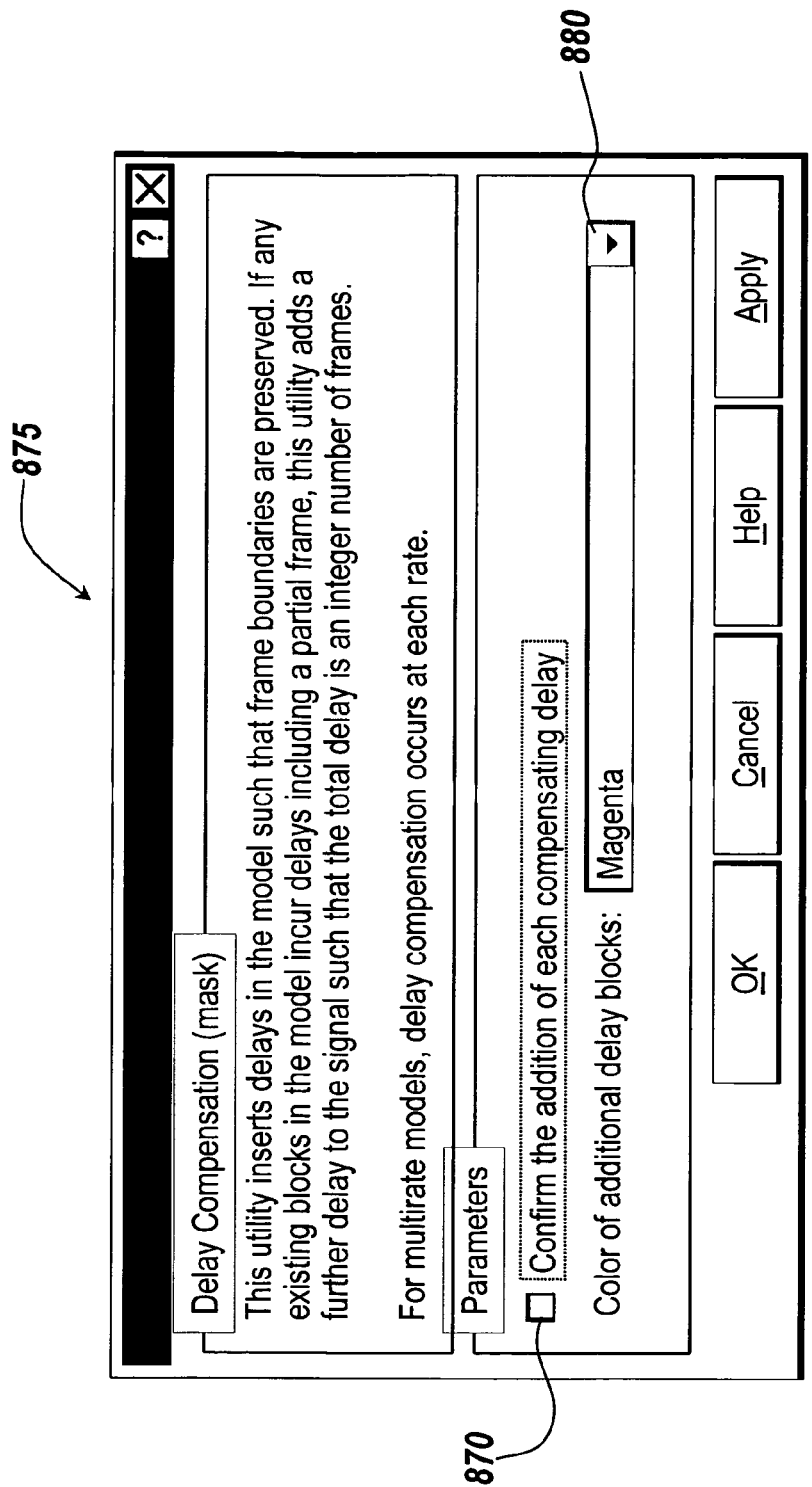
FIG. 8B shows an exemplary user interface provided for the users to set up the parameters of the model-wide delay compensation option.

If the users select automatic delay compensation, a compensation element, such as a compensation delay block 890, may be automatically inserted into the model 800, as shown in FIG. 8C. For a multi-rate system, different compensation elements may be inserted to compensate for delay incurred at each rate. As described above, the model 800 has delay at an interpolated (i.e., high) rate and the delay compensation block 890 is added at the high rate prior to the FIR Decimation block 850. If the model includes multiple blocks that incur delay at the high rate, the automatic compensation may cascade the delay of the multiple blocks and insert a single compensation block to account for all of the delay at the high rate. If the model 800 includes a block or blocks that incur delay at a low rate, a separate compensation block may be inserted to compensate for the delay at the low rate.

The compensation delay block 890 adds delay to the model 800 such that the frame boundaries of signals are preserved. The compensation block 890 may be colored as designated in the user interface depicted in FIG. 8B. The delay amount of the compensation delay block 890 is determined based on the delay incurred in the model 800. For example, if the signals are a frame-based signal with a frame length of 10 samples, the signals pass through the delay block 840 that incurs a delay of 1 sample. Thus, the compensation delay block 890 incurs a further signal delay of 9 samples, thus yielding a 10-sample, or 1-frame, delay.

Figure 9A:
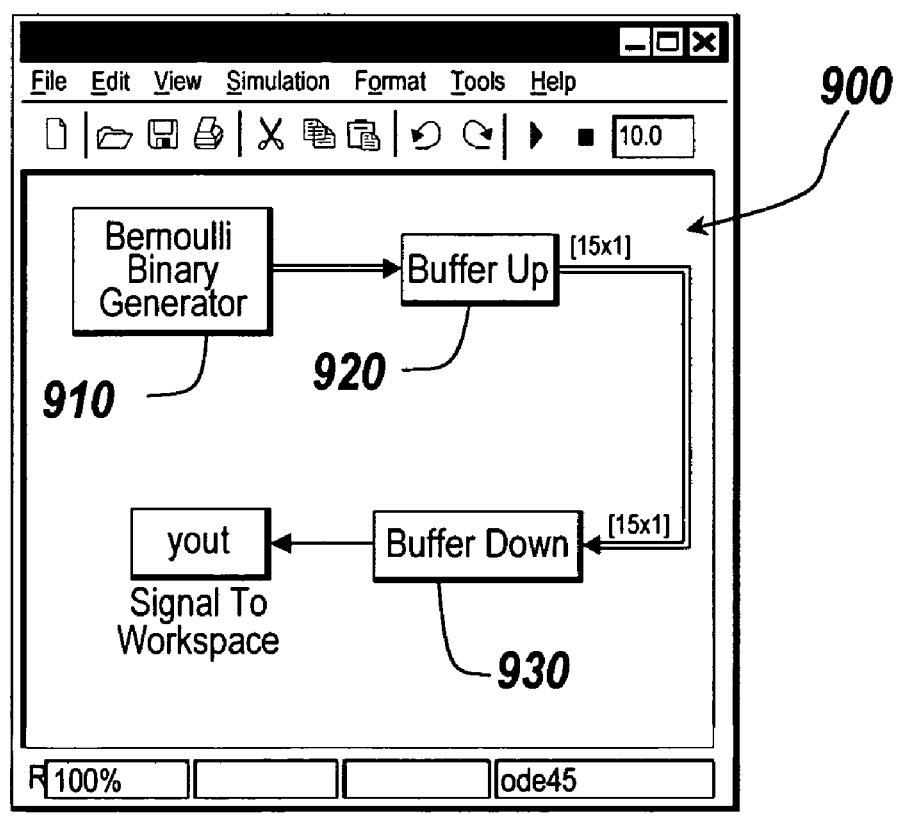
FIG. 9A is an exemplary model to illustrate an element-by-element delay compensation option.

An illustrative embodiment may provide a block-by-block delay compensation option. This compensation option may be useful when the operation of a model is done in pairs, such as modulators and demodulators, encoders and decoders, etc., which is often the case in a communication system. FIG. 9A depicts an exemplary model 900 to illustrate the element-by-element delay compensation option. The model 900 includes a Bernoulli Binary Generator block 910, a Buffer Up block 920 and Buffer Down block 930. It is assumed that the Buffer Up and Buffer Down blocks 920 and 930 operate at the same rate. The Buffer Up block 920 and Buffer Down block 930 may be defined as a pair of blocks. For example, the Buffer Up block 920 may receive frames of size 10 samples, and output frames of 15 samples with a 15-sample delay. The Buffer Down block 930 may receive frames of size 15 samples, and output frames of 10 samples with no delay. FIG. 9B depicts the frame timing diagram of the model 900 without compensation. In the frame timing diagram, the beginning of the frame at the output of the Buffer Down block 930 is in the middle of the frame relative to the output of the Bernoulli Binary Generator block 910.

Figure 9C:
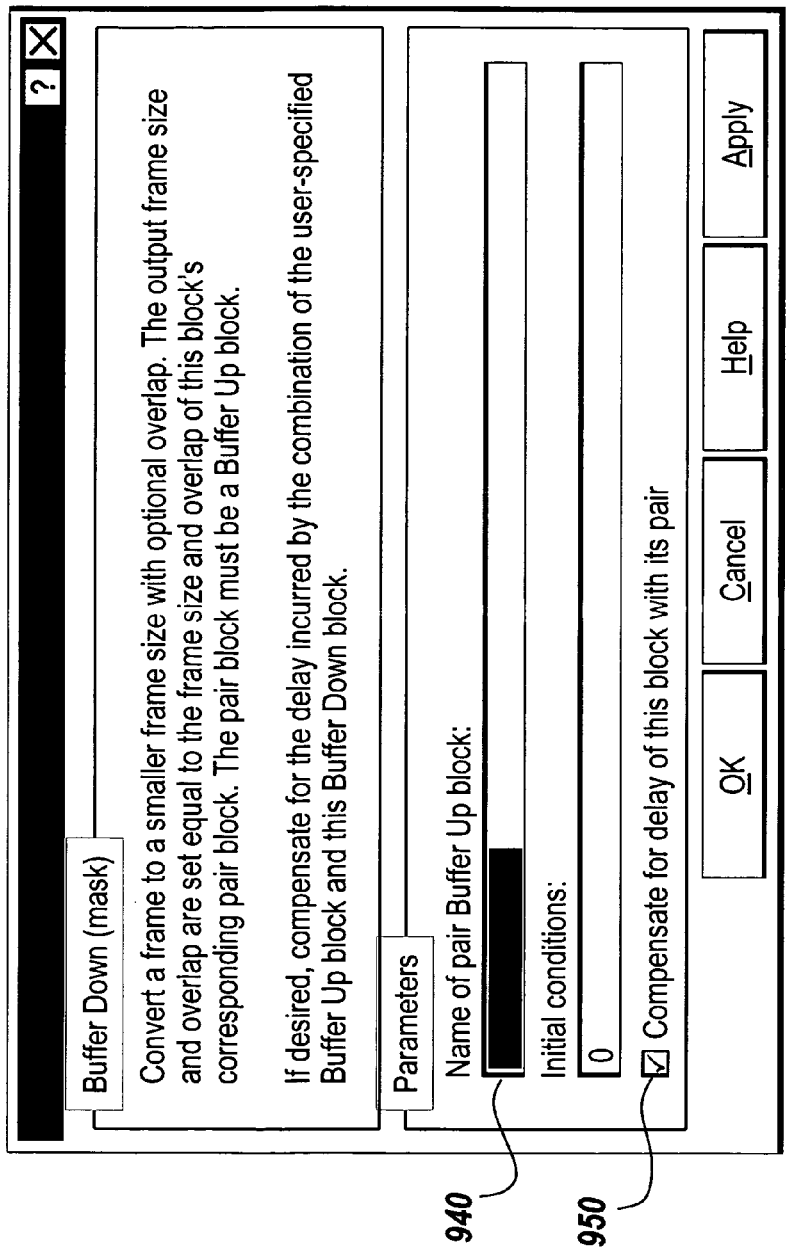
FIG. 9C shows an exemplary user interface for manipulating parameters of the Buffer Down block, the second half of the pair of blocks.

The users may click on a "Tools" menu in the menu bar to bring up the block-block delay compensation option. If the users select the block-by-block compensation option, the "second half" of a pair of blocks may include an option by which the cumulative delay of the pair of blocks is compensated for. FIG. 9C depicts an exemplary user interface 975 for manipulating parameters of the Buffer Down block 930, the second half of the pair of blocks.

The user interface 975 provides parameters for setting the block-block delay compensation function for compensating for the delay incurred in the Buffer Up block 920 the Buffer Down block 930. The parameters may include an option 940 to designate the name of the pair Buffer Up block 920 and an option 950 to select compensation for delay incurred by the pair of blocks. If the option 950 is selected, the delay of the model 900 is compensated for with the result of the frame timing changes as depicted in FIG. 9D.

In the compensated frame timing, the Buffer Down block 930 introduces a 5 sample delay such that the frames out of the Bernoulli Binary Generator block 910 and the Buffer Down block 930 are aligned. In one embodiment, the 5 sample delay may be colored to indicate that it is inserted by a delay compensation mechanism. In a multi-rate system, the Buffer Down block 930 should operate at the same or higher rate than the Buffer Up block 920 to compensate for the delay incurred in the Buffer Up block 920. If the Buffer Up block 930 operates at a higher rate and induces 1 sample delay, the Buffer Down block 930 cannot compensate for the delay if the Buffer Down block 930 operates at a lower rate than the Buffer Up block 920.

The techniques for reporting of algorithmic delay may also be applied to reporting actual execution or computational delays incurred in executing a model (e.g., the models 300, 700, 800, 900, etc.) in a targeted piece of hardware. In reporting the execution or computational delay, the delay may be shown in terms of time, and the delay may represent the time of execution for each block in the model (e.g., the models 300, 700, 800, 900, etc.) by the targeted hardware.

Figure 10:
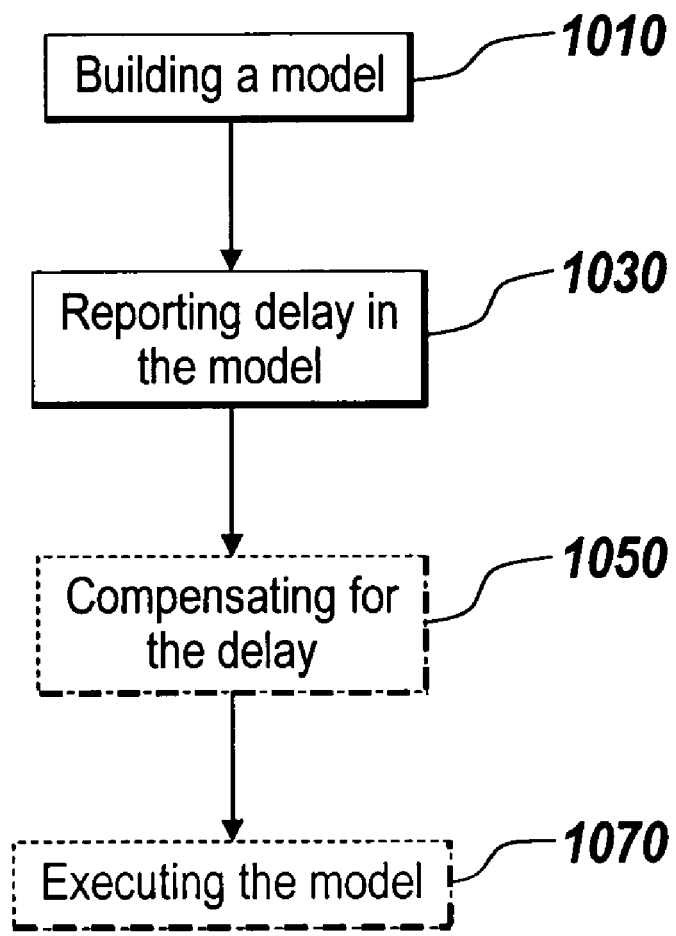
FIG. 10 is a flow chart showing an exemplary operation for reporting delay incurred in a model.

FIG. 10 is a flow chart showing an exemplary operation of an embodiment that can be used to report delay incurred in a model. Users may build the model 300 using the editor 110 (step 1010). The user may instruct the graphical modeling environment 100 to initiate reporting the delay incurred in the model 300 or the graphical modeling environment 100 may initiate reporting the delay incurred automatically. To report the delay incurred in the model, the graphical modeling environment may compile and execute the model 300.

The graphical modeling environment 100 may automatically call execution methods needed for reporting the delay incurred in the model 300. The graphical modeling environment 100 reports the delay to the user (step 1030). The delay can be reported using the GUI 400, GUI 600a, GUI 600b, GUI 600c, the sample numbers 710-714 depicted on FIG. 7, the color schemes discussed herein, or by any other means. The sample number 710-714 of FIG. 7 and/or the color schemes discussed herein can provide a visual indication on the sections of the model, and therefore can provide a visual cue to the user of the sections of the model that incur delay. The graphical modeling environment 100 may optionally add delay to a portion of the model to compensate for the calculated amount of the delay of another portion of the model (step 1050). Embodiments provide a model-wide delay compensation option, which is discussed with regard to FIGS. 8A-C, as well as a block-by-block delay compensation option, which is discussed with regard to FIGS. 9A-C. After the delay is properly compensated, the model may optionally be executed by the execution engine 130 (step 1070).

In summary, exemplary embodiments provide tools for reporting delay incurred in a model. For example, a model may be implemented using a block diagram modeling tool or may be implemented in other modeling environments. The delay incurred in the model may be displayed in a user interface element that provides information on the timing of the elements in the model. The user interface element may provide the timing information of selected elements in the model so that users may be able to analyze a part of the model instead of the entire model. The delay information may also be provided to users within the block diagram representation of the model. Further, automatic compensation may be provided for the delay. By reporting the delay incurred in a model prior to the execution of the model, exemplary embodiments enable users to compensate for the delay without executing the model.

Exemplary embodiments may be provided as one or more computer-readable programs embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus. In general, the computer-readable programs may be implemented in any programming language. Some examples of languages that can be used include Python, C, C++, C#, Java, Javascript etc. Further, the computer readable programs can be implemented in a hardware description language or any other language that allows prescribing computation such as, for example, Deoxyribonucleic acid (DNA). The software programs may be stored on or in one or more mediums as object code.

Certain exemplary embodiments are described above. It is, however, expressly noted that these exemplary embodiments are not limiting. Moreover, it is to be understood that the features of the various exemplary embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. For example, an illustrative embodiment may be practiced in any other modeling environments including textual and graphical modeling environments, such as a state-based modeling environment and/or an entity flow diagram modeling environment. Practitioners of the art will realize that the sequence of steps and architectures depicted in the figures may be altered without departing from the scope of the present invention and that the illustrations contained herein are singular examples of a multitude of possible depictions of the present invention.

What is claimed:

1. In a computing device, a method for reporting delay incurred in a model, the method comprising:
   depicting a graphical affordance in the model via an output device;
   depicting a visual indicator on or about the depicted graphical affordance;
   determining an amount of incurred delay related to the graphical affordance, the delay corresponding to at least one of an algorithmic delay, an execution delay, or a computational delay, the determining comprising:
      querying at least one element in the graphical affordance to find intrinsic information on the amount of delay for the graphical affordance, or
      running a simulation to determine an algorithmic delay related to the graphical affordance when the graphical affordance does not contain intrinsic information about the algorithmic delay; and
   changing an appearance of the visual indicator to reflect the determined amount of delay.

2. The method of claim 1, wherein the visual indicator is a color.

3. The method of claim 2, wherein the incurred delay represents an amount of delay.

4. The method of claim 3, wherein the visual indicator represents a range of delay values, and the amount of delay is within the range of delay values.

5. The method of claim 3, wherein the color represents the amount of incurred delay.

6. The method of claim 3, wherein the amount of delay is provided as one of time, samples or frames.

7. The method of claim 1, wherein the environment is a graphical modeling environment.

8. The method of claim 7, wherein the environment is at least one of a time-based block diagram modeling environment, a state-based diagram modeling environment or a data flow diagram modeling environment.

9. The method of claim 1, wherein the graphical affordance of the model is at least one of a signal or an element.

10. The method of claim 1, wherein the providing the visual indicator is a numeric value that represents an amount of the incurred delay.

11. A non-transitory medium holding instructions executable in a computing system that provides an environment for modeling a system, the instructions for:
   depicting a graphical affordance in the model via an output device;
   depicting a visual indicator on or about the depicted graphical affordance;
   determining an amount of incurred delay related to the graphical affordance, the delay corresponding to at least one of an algorithmic delay, an execution delay, or a computational delay, the determining comprising:
      querying at least one element in the graphical affordance to find intrinsic information on the amount of delay for the graphical affordance, or running a simulation to determine an algorithmic delay related to the graphical affordance when the graphical affordance does not contain intrinsic information about the algorithmic delay; and changing an appearance of the visual indicator to reflect the determined amount of delay.

12. The medium of claim 11, wherein the visual indicator is a color.

13. The medium of claim 12, wherein the incurred delay represents an amount of delay.

14. The medium of claim 13, the visual indicator represents a range of delay values and the amount of delay is within the range of delay values.

15. The medium of claim 13, wherein the color represents the amount of delay incurred.

16. The medium of claim 13, wherein the amount of delay is provided as one of time, samples or frames.

17. The medium of claim 13, wherein the model comprises a second graphical affordance that is dependent on an output of the graphical affordance.

18. The medium of claim 17, wherein the medium further comprises instructions for:

providing a second visual indicator proximate to the second graphical affordance that corresponds to an incurred delay for the second graphical affordance.

19. The medium of claim 18, wherein the second visual indicator is a color.

20. The medium of claim 19, wherein an amount of delay of the second graphical affordance of the model is an absolute amount of delay.

21. The medium of claim 19, wherein an amount of delay of the second graphical affordance in the model is relative to the amount of delay of the graphical affordance.

22. The medium of claim 21, wherein the second visual indicator is a different intensity of the color used to indicate the graphical affordance, the different intensity showing an accumulation of delay.

23. The medium of claim 11, wherein the environment is a graphical modeling environment.

24. The medium of claim 11, wherein the environment is at least one of a time-based block diagram modeling environment, a state-based diagram modeling environment or a data flow diagram modeling environment.

25. The medium of claim 11, wherein the graphical affordance of the model is at least one of a signal or an element.

26. The medium of claim 11, wherein the providing the visual indicator is a numeric value that represents an amount of the incurred delay.

27. A computing system for reporting an amount of delay incurred in a model in a modeling environment, the system comprising:

a modeling environment providing the model, the model comprising a graphical affordance;

an output device for depicting the graphical affordance, the depicting incorporating a visual indicator; and a processor for:

determining an amount of incurred delay relating to the graphical affordance, the delay corresponding to at least one of an algorithmic delay, an execution delay, or a computational delay, the determining comprising:

querying at least one element in the graphical affordance to find intrinsic information on the amount of delay for the graphical affordance, or running a simulation to determine an algorithmic delay related to the graphical affordance when the graphical affordance does not contain intrinsic information about the algorithmic delay, and changing an appearance of the visual indicator to reflect the determined amount of delay.

28. The system of claim 27, wherein the visual indicator is a color.

29. The system of claim 28, wherein the incurred delay represents an amount of delay.

30. The system of claim 29, wherein the visual indicator represents a range of delay values and the particular amount of delay is within the range of delay values.

31. The system of claim 29, wherein the color represents the amount of delay incurred.

32. The system of claim 29, wherein the amount of delay is provided as one of time, samples or frames.

33. The system of claim 27, wherein the graphical affordance of the model is at least one of a signal or an element.

34. The system of claim 27, wherein the depicting occurring via the output device prior to executing the model.

35. The system of claim 27, wherein the modeling environment comprises at least one of a time-based block diagram modeling environment, a state-based and flow diagram modeling environment or a data flow diagram modeling environment.

36. In a computing system, a method for reporting delay incurred in a model, the method comprising:

identifying an incurred delay that is related to a graphical affordance in the model, the incurred delay including at least one of an algorithmic delay, an execution delay, or a computational delay, the identifying comprising:

querying at least one element in the graphical affordance to find intrinsic information on the amount of delay for the graphical affordance, or running a simulation to determine an algorithmic delay related to the graphical affordance when the graphical affordance does not contain intrinsic information about the algorithmic delay;

generating a visual indicator associated with the graphical affordance in the model;

rendering the visual indicator with an output device; and changing the visual indicator to depict the incurred delay that is related to the graphical affordance in the model.

37. The method of claim 36, wherein the rendering renders the visual indicator on the graphical affordance in the model.

38. The method of claim 37, wherein the visual indicator is a color.

39. The method of claim 37, wherein the visual indicator is a numeric value that represents an amount of delay.

40. The method of claim 36, wherein the rendering renders the visual indicator in a user interface.

41. A non-transitory medium holding instructions executable in a computing system that provides an environment for modeling a system, the instructions for:

identifying an incurred delay that is related to a graphical affordance in the model, the incurred delay including at least one of an algorithmic delay, an execution delay, or a computational delay, the identifying comprising:

querying at least one element in the graphical affordance to find intrinsic information on the amount of delay for the graphical affordance, or running a simulation to determine an algorithmic delay related to the graphical affordance when the graphical affordance does not contain intrinsic information about the algorithmic delay;

generating a visual indicator for use with the graphical affordance in the model;

rendering the visual indicator with an output device; and changing the visual indicator to depict the incurred delay that is related to the graphical affordance in the model.

42. The medium of claim 41, wherein the rendering renders the visual indicator on the graphical affordance in the model.

43. The medium of claim 42, wherein the visual indicator is a color.

44. The medium of claim 42, wherein the visual indicator is a numeric value that represents an amount of delay.

45. The medium of claim 41, wherein the rendering renders the visual indication in a user-interface.

46. The medium of claim 45, wherein the rendering further comprises:

generating a plurality of graphical representations to represent samples in the user-interface that are related to at least one element in the model.

47. The medium of claim 46, wherein the medium further comprises instructions for:

identifying at least one of the graphical representations with the visual indicator to identify at least one sample.

48. The medium of claim 46, wherein the plurality of graphical representations occupy an identical amount of area in the user-interface.

49. The medium of claim 46, wherein the plurality of graphical representations occupy a different amount of area based on a sample rate of the at least one element.

50. The medium of claim 46, wherein the rendering further comprises:

generating a graphical representation of a frame that comprises a number of the samples.

51. The medium of claim 50, wherein the medium further comprises instructions for:

changing a size of the graphical representation based on a change in a frame rate of the frame.

52. The medium of claim 45, wherein the medium further comprises instructions for:

modifying a graphical representation in the user-interface; and updating the model to reflect the modifying.

53. The medium of claim 45, wherein the user-interface separates an algorithmic delay from a computational delay.

54. The medium of claim 45, wherein the user-interface depicts at least one of a relative delay or an absolute delay.

55. The medium of claim 45, wherein the medium further comprises instructions for:

inserting a delay element into the model based on an analysis of the delay in the user-interface.

56. The medium of claim 45, wherein the medium further comprises instructions for:

specifying a number of elements to be represented in the user-interface; and representing the number elements to graphical represent a delay that is associated with the number of elements.

57. The medium of claim 41, wherein the model comprises at least one of a block diagram, a state diagram or a data flow diagram.

* * * * *